United States Patent
Furumi et al.

(10) Patent No.: US 11,868,607 B2
(45) Date of Patent: Jan. 9, 2024

(54) DISPLAY APPARATUS, DISPLAY METHOD, AND NON-TRANSITORY RECORDING MEDIUM

(71) Applicants: Yui Furumi, Tokyo (JP); Takuroh Yoshida, Kanagawa (JP)

(72) Inventors: Yui Furumi, Tokyo (JP); Takuroh Yoshida, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 18/158,667

(22) Filed: Jan. 24, 2023

(65) Prior Publication Data
US 2023/0289053 A1    Sep. 14, 2023

(30) Foreign Application Priority Data

Mar. 10, 2022 (JP) .................................. 2022-037466
Nov. 30, 2022 (JP) .................................. 2022-192217

(51) Int. Cl.
*G06F 3/04883*   (2022.01)
*G06V 30/32*     (2022.01)
*G06F 3/04845*   (2022.01)
*G06F 3/0482*    (2013.01)
*G06V 30/22*     (2022.01)

(52) U.S. Cl.
CPC ........ *G06F 3/04883* (2013.01); *G06F 3/0482* (2013.01); *G06F 3/04845* (2013.01); *G06V 30/22* (2022.01); *G06V 30/32* (2022.01)

(58) Field of Classification Search
CPC ............... G06F 3/04883; G06F 3/0482; G06F 3/04845; G06V 30/32; G06V 30/22
USPC ......................................................... 345/156
See application file for complete search history.

(56) References Cited

U.S. PATENT DOCUMENTS

| | | | | |
|---|---|---|---|---|
| 5,867,150 A | * | 2/1999 | Bricklin | ............... G06F 3/04883 345/173 |
| 2004/0179238 A1 | * | 9/2004 | Nakatsuka | ........... H04N 1/4092 358/2.1 |
| 2015/0205398 A1 | * | 7/2015 | Le | ........................... G06F 3/017 345/173 |
| 2019/0324963 A1 | | 10/2019 | Mano | |
| 2020/0175889 A1 | * | 6/2020 | Delson | ..................... G09B 5/02 |
| 2022/0084279 A1 | * | 3/2022 | Lindmeier | .............. G06F 3/017 |

FOREIGN PATENT DOCUMENTS

JP        2019-192229       10/2019

* cited by examiner

*Primary Examiner* — Mark Edwards
(74) *Attorney, Agent, or Firm* — IPUSA, PLLC

(57) ABSTRACT

A display apparatus includes circuitry to receive input of a hand drafted input, convert the hand drafted input into a shape, and determine whether the shape is an object selecting shape that is preset to be available for selecting an object displayed in the object selecting shape on a display. In a case that the shape is determined to be the object selecting shape, the circuitry displays, on the display, a display component to be operated for receiving selection of the object. In a case that the display component is operated, the circuitry causes the object to be a selected state.

13 Claims, 20 Drawing Sheets

FIG. 5A

| PAGE DATA ID | START TIME | END TIME | STROKE ARRANGEMENT DATA |
|---|---|---|---|
| p001 | 20130610102434 | 20130610102802 | st001 |
| p002 | 20130610102815 | 20130610103225 | st002 |
| p003 | 20130610103545 | 20130610104233 | st003 |
| ... | ... | ... | ... |

FIG. 5B st001 / st002 / st003

| STROKE DATA ID | START TIME | END TIME | COLOR | WIDTH | RECOGNI-TION GROUP | TYPE | COORDINATE ARRAY DATA ID |
|---|---|---|---|---|---|---|---|
| s001 | 20130610102502 | 20130610102505 | ff0000 | 2 | g1 | TEXT | c001 |
| s002 | 20130610102612 | 20130610102615 | 000ff0 | 3 | g1 | TEXT | c002 |
| s003 | 20130610102704 | 20130610102712 | 0 | 1 | g2 | SHAPE | c003 |
| ... | ... | ... | ... | ... | ... | ... | ... |

FIG. 5C

| X COORDINATE VALUE | Y COORDINATE VALUE | TIME DIFFERENCE | DRAWING PRESSURE |
|---|---|---|---|
| 10 | 10 | 100 | 255 |
| 12 | 10 | 200 | 255 |
| 14 | 12 | 300 | 255 |
| ... | ... | ... | ... | c001
c002
c003

| OBJECT ID | TYPE | PAGE | COOR-DINATES | SIZE | ... |
|---|---|---|---|---|---|
| 1 | HAND DRAFTED | 1 | x1,y1 | W1,H1 | ... |
| 2 | TEXT | 1 | x2,y2 | W2,H2 | ... |
| 3 | SHAPE | 1 | x3,y3 | W3,H3 | ... |
| 4 | IMAGE | 2 | x4,y4 | W4,H4 | ... |
| 5 | SHAPE | 3 | x5,y5 | W5,H5 | ... |
| 6 | TEXT | 4 | x6,y6 | W6,H6 | ... |
| 7 | IMAGE | 4 | x7,y7 | W7,H7 | ... |
| ... | ... | ... | ... | ... | ... |

DISPLAY APPARATUS, DISPLAY METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2022-037466, filed on Mar. 10, 2022, and 2022-192217, filed on Nov. 30, 2022, in the Japan Patent Office, the entire disclosures of which are hereby incorporated by reference.

BACKGROUND

Technical Field

The present disclosure relates to a display apparatus, a display method, and a non-transitory recording medium.

Related Art

Known display apparatuses convert handwriting data or hand drafted data into text and display the text on a display by using a handwriting recognition technique. Such a display apparatus having a relatively large touch panel is used as, for example, an electronic whiteboard by a plurality of users in a conference room or a public facility.

A snapshot technique that stores, as image data, an object displayed by a display apparatus is known. A technique for registering, as an action item, a character string enclosed by hand drafted input is known.

SUMMARY

An embodiment of the present disclosure includes a display apparatus including circuitry to receive input of a hand drafted input, convert the hand drafted input into a shape, and determine whether the shape is an object selecting shape that is preset to be available for selecting an object displayed in the object selecting shape on a display. In a case that the shape is determined to be the object selecting shape, the circuitry displays, on the display, a display component to be operated for receiving selection of the object. In a case that the display component is operated, the circuitry causes the object to be a selected state.

An embodiment of the present disclosure includes a display method. The display method including receiving input of a hand drafted input, converting the hand drafted input into a shape, and determining whether the shape is an object selecting shape that is preset to be available for selecting an object displayed in the object selecting shape. The display method further includes displaying, on a display, a display component to be operated for receiving selection of the object in response to determining that the shape is the object selecting shape, and causing the object to be a selected state in response to the display component being operated.

An embodiment of the present disclosure includes a non-transitory recording medium storing a plurality of instructions which, when executed by one or more processors, causes the processors to perform the above-described method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 5A, 5B, and 5C are diagrams illustrating data related to stroke data stored in a stroke data storage unit according to the exemplary embodiment of the disclosure;

Figure 1:
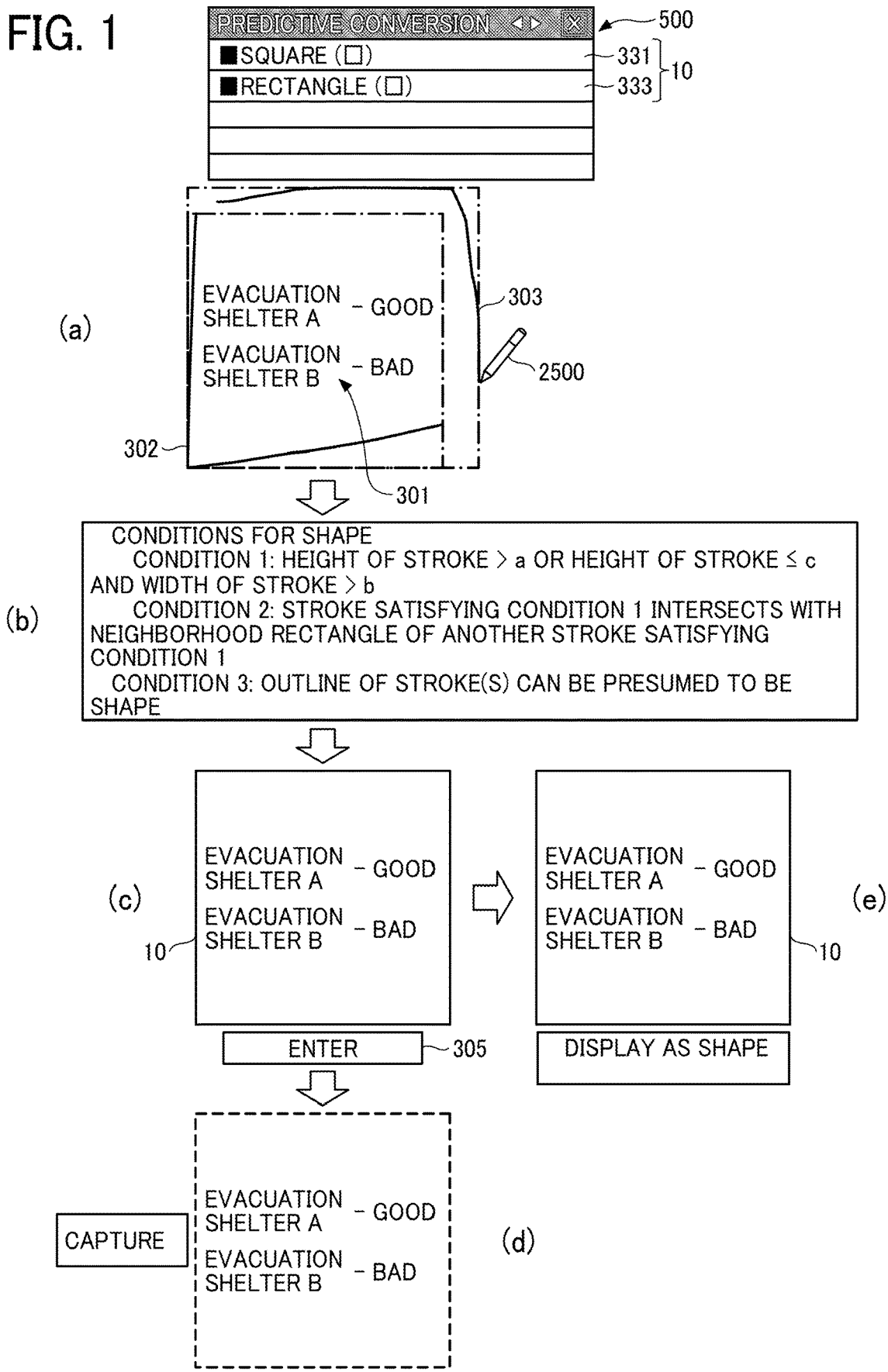
FIG. 1 is a diagram illustrating a process of converting a stroke input by hand drafted input into a shape, according to an exemplary embodiment of the disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A display apparatus and a display method performed by the display apparatus according to one or more embodiments of the present disclosure are described with reference to the attached drawings.

Overview of Shape Recognition

The display apparatus according to the present embodiment uses a shape drawn by hand drafted input of a user when selecting an object. The shape refers to various shapes, outlines, contours, or line shapes, determined by a certain rule. In the present embodiment, a range enclosed by a shape is a selection range, and an object or image data in the shape is one to be selected. Although there are many types of shapes such as a triangle, a quadrangle, a circle, and a rhombus, an object selecting shape is preset. The object selecting shape is a predetermined shape with which an object is selectable for subsequent operation to be performed on object data representing the object. The user can display a drawn shape as the shape or use the drawn shape to select an object (the drawn shape used to select the object is to be deleted). Accordingly, in the present embodiment, whether a stroke is recognized as a shape or not is determined.

With reference to FIG. 1, an overview of conditions under which a display apparatus 2 recognizes a stroke 302 and a stroke 303, namely a pair of strokes 302 and 303, as a shape is described. FIG. 1 is a diagram illustrating a process of converting the pair of strokes 302 and 303 input by hand drafted input into a shape. As illustrated in (a) of FIG. 1, a user draws, or inputs by hand drafted input, one or more strokes that is the pair of strokes 302 and 303 while considering an object 301 that is an object desired to be selected by the user.

The display apparatus 2 determines whether the pair of strokes 302 and 303 satisfies conditions 1 to 3 illustrated in (b) of FIG. 1. Although each of the conditions 1 to 3 is to be described in detail later, in the condition 1, whether each of the stroke 302 and the stroke 303 is a shape element or not is determined based on a size and an outline or a line shape of each of the stroke 302 and the stroke 303. In the condition 2, whether the stroke 302 and the stroke 303 belong to the same recognition group or not is determined. The same recognition group is one or more strokes that are collectively converted into text or shapes, for example. In the condition 3, whether an outline, or a line shape, of the stroke coincides with a particular shape (including an object selecting shape). According to the conditions 1 and 2, a stroke that has a feature of a shape is determined to have a shape element, and a stroke that does not have such a feature is determined to be text such as a character. In other words, the user can input both text and a shape without switching a mode by changing a line shape profile or a size of a stroke input by hand drafted input.

When the pair of strokes 302 and 303 satisfies the conditions 1 to 3, the display apparatus 2 determines that the stroke 302 and the stroke 303, which corresponds to the one or more strokes, are shape elements, deletes the pair of strokes 302 and 303, which corresponds to the one or more strokes, and displays an object selecting shape 10 and an enter button 305 (an example of a display component) (see (c) of FIG. 1). The enter button 305 (an example of a display component) is displayed close to or adjacent to the object selecting shape 10 or the object 301. With this configuration, the user can select the enter button 305 while checking the object selecting shape 10 or the object 301. This allows the user to select an object easily by hand drafted input operation. In addition, by not selecting the enter button 305, the user can select to draw a shape by hand drafted input operation. With this configuration, drawing a shape by hand drafted input operation and selecting an object by hand drafted input operation can be selectively used.

When a stroke satisfying the conditions 1 to 3 is input by hand drafted input, the display apparatus 2 basically displays an operation guide 500. The operation guide 500 displays conversion candidates for text and a shape and receives a final selection according to a user operation. A converted candidate for a shape is referred to as a shape conversion candidate 11. The shape conversion candidate 11 may include the object selecting shape 10.

When the enter button 305 is pressed, the display apparatus 2 captures the object 301 displayed in the object selecting shape 10 and deletes the object selecting shape 10 (see (d) of FIG. 1). The object 301 turns to be a selected state and is further stored.

When the enter button 305 is not pressed for a predetermined period of time, the display apparatus 2 displays the shape of the object selecting shape 10 without capturing the object 301 displayed in the object selecting shape 10 (see (e) of FIG. 1). The predetermined period of time may be set by a designer or a user. Accordingly, the pair of strokes 302 and 303 input by the user can be used for selecting the object 301, or can be directly input as a shape.

As described above, in the display apparatus 2 according to the present embodiment, the input of the shape and the selection of the object 301 are switched depending on whether the enter button 305 is pressed or not in inputting the shape. Accordingly, the user does not have to perform an operation of switching a mode of the display apparatus 2 to a selection mode (selection reception mode) for selecting the object 301. In addition, since whether the pair of strokes 302 and 303 is a shape or not is determined based on a height and a width of the pair of strokes 302 and 303, the user does not have to perform an operation of switching between a character recognition mode and a shape input mode.

Terms

"Input device" refers to any devices with which a user hand drafted input is performable by designating coordinates on a touch panel. Examples thereof include a pen, a human finger, a human hand, and a bar-shaped member.

A series of user operations including engaging a writing mode, recording movement of an input device or portion of a user, and then disengaging the writing mode is referred to as a stroke. The engaging of the writing mode may include, if desired, pressing an input device against a display or screen, and disengaging the writing mode may include releasing the input device from the display or screen. Alternatively, a stroke includes tracking movement of the portion of the user without contacting a display or screen. In this case, the writing mode may be engaged or turned on by a gesture of a user, pressing a button by a hand or a foot of the user, or otherwise turning on the writing mode, for example using a pointing device such as a mouse. The disengaging of the writing mode can be accomplished by the same or different gesture used to engage the writing mode, releasing the button, or otherwise turning off the writing mode, for example using the pointing device or mouse.

"Stroke data" is data based on a trajectory of coordinates of a stroke input with the input device, and the coordinates may be interpolated appropriately. "Hand drafted data" refers to data having one or more pieces of stroke data. "Hand drafted input" relates to a user input such as handwriting, drawing, and other forms of input. The hand drafted input may be performed via touch interface, with a tactile object such as a pen or stylus or with the user's body. The hand drafted input may also be performed via other types of input, such as gesture-based input, hand motion tracking input or other touch-free input by a user. The hand drafted input includes handwriting input. The following discussion may refer to hand drafted input and hand drafted input data, but other forms of hand drafted input may be utilized and are within the scope of the present disclosure.

An "object" refers to an item displayed on a screen.

The term "object" in this specification also represents an object to be displayed.

An "object" obtained by handwriting recognition or hand drafted recognition and conversion of stroke data may include, in addition to character strings, a stamp of a given character or mark such as "complete," a graphic such as a circle or a star, or a line.

A mode is a state of the display apparatus in which specific processing can be performed. An object selection mode is a mode in which selection of an object can be received.

Start of a selection mode refers to entering a state in which the user can select an object using a shape recognized by a conversion unit 23. The enter button 305 is displayed from a start to an end of the selection mode.

In the selection mode, the user selects an object by changing a size or a position of a shape so that the object is within in a shape. The selected object is to be saved, copied, cut, or moved, for example. The entire object does not have to be within the shape. It is sufficient that an area of a circumscribed rectangle of the object may be overlapped with an area of a circumscribed rectangle of the shape by a certain amount or more.

The selected state refers to a state in which an object is specified as one to be processed by the display apparatus 2. The object being the selected state can be saved, moved, copied, deleted, changed in color, changed in size, changed in line thickness, or changed in line type, for example.

Configuration of Apparatus

Figure 2A:
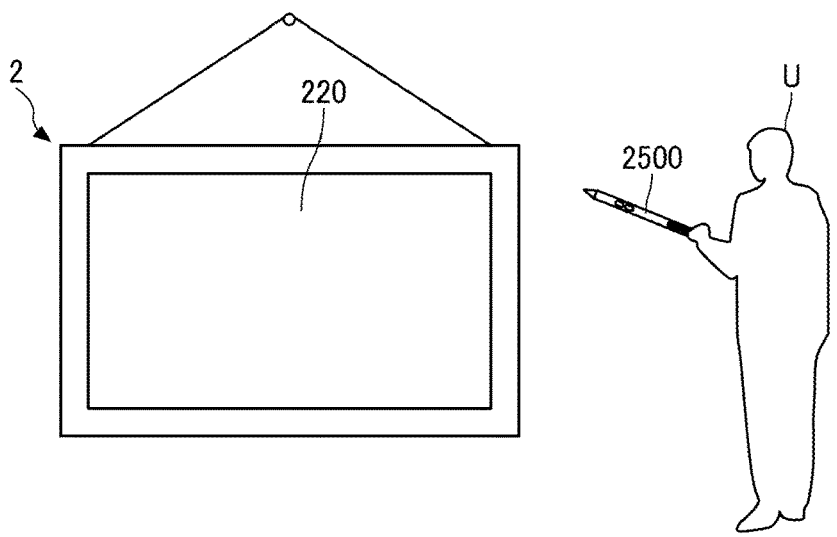
FIG. 2A to FIG. 2C are diagrams each illustrating an example of a placement of the display apparatus in use, according to the exemplary embodiment of the disclosure.
Figure 2B:
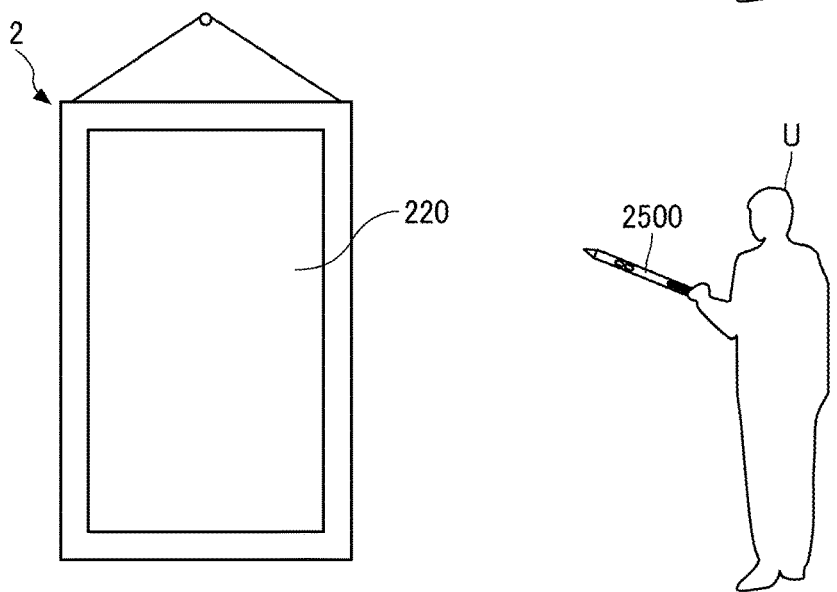
Figure 2C:
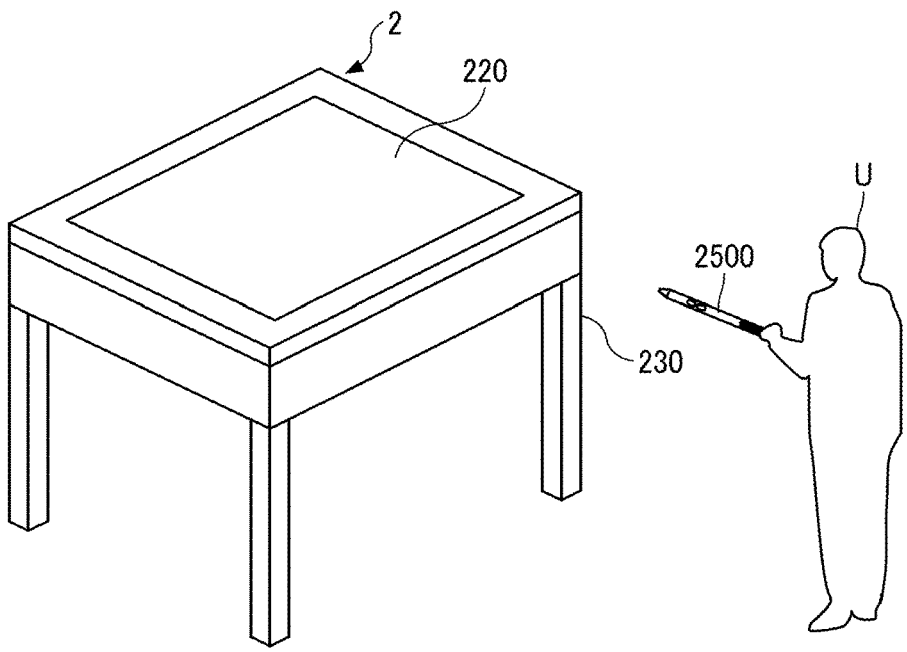

An exemplary placement of the display apparatus 2 in use according to the present embodiment is described with reference to FIGS. 2A to 2C. FIG. 2A to FIG. 2C are diagrams each illustrating an example of a placement of the display apparatus 2 in use according to the present embodiment. FIG. 2A illustrates, as an example of the display apparatus 2, an electronic whiteboard having a landscape-oriented rectangular shape and being hung on a wall.

As illustrated in FIG. 2A, the display apparatus 2 includes a display 220. A user U handwrites (also referred to as "inputs" or "draws"), for example, a character on the display 220 using a pen 2500.

FIG. 2B illustrates, as another example of the display apparatus 2, an electronic whiteboard having a portrait-oriented rectangular shape and being hung on a wall.

FIG. 2C illustrates, as another example, the display apparatus 2 placed on the top of a desk 230. Since the display apparatus 2 has a thickness of about 1 centimeter, the desk 230 does not need to be adjusted when the display apparatus 2 is placed on the top of the desk 230, which is a general-purpose desk. Further, the display apparatus 2 is portable and easily moved by the user.

Examples of an input method of coordinates by the pen 2500 include an electromagnetic induction method and an active electrostatic coupling method. In other example, the pen 2500 further has functions such as pen pressure detection, inclination detection, a hover function (displaying a cursor before the pen is brought into contact), or the like.

Hardware Configuration

Figure 3:
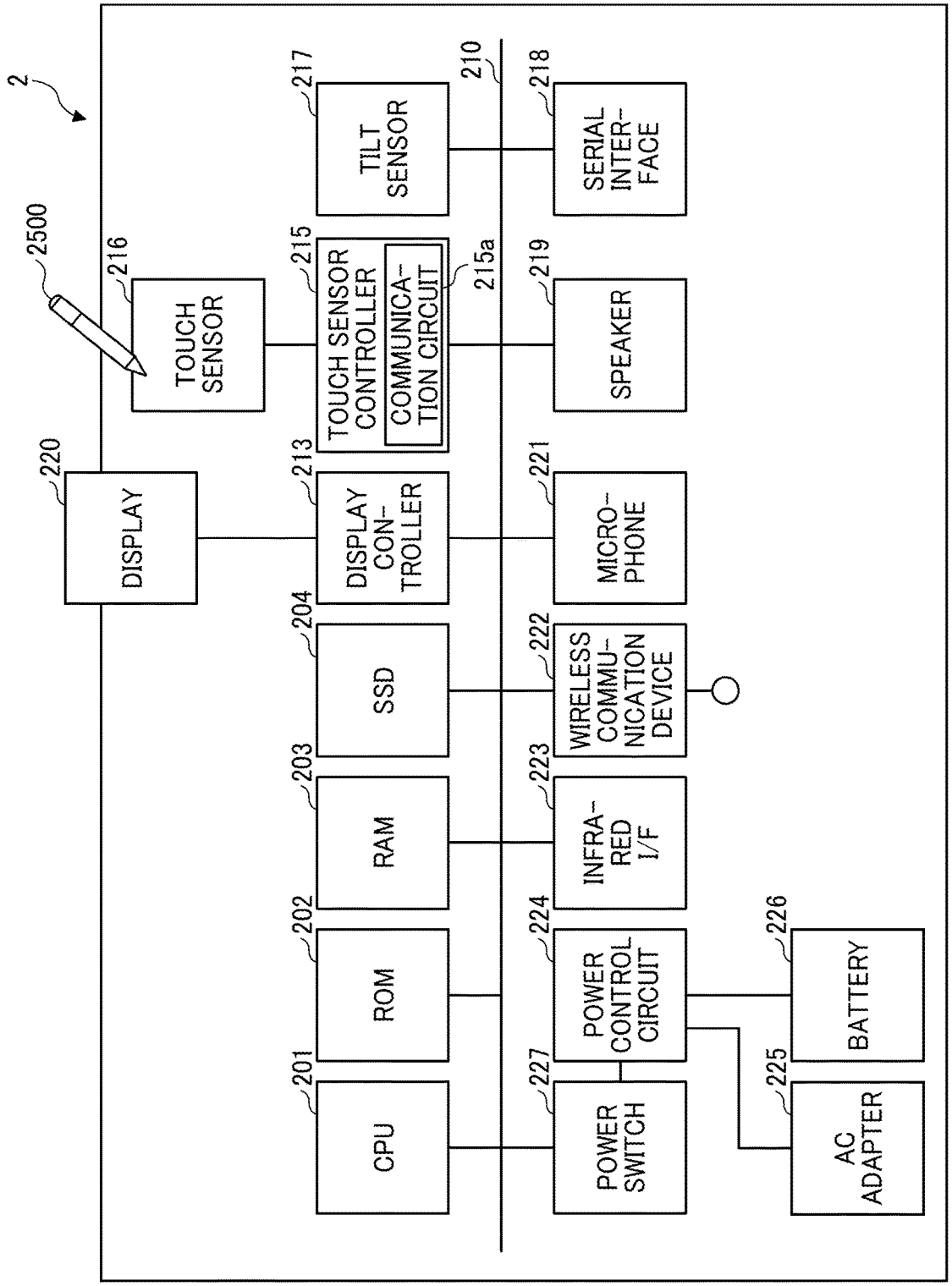
FIG. 3 is a block diagram illustrating an example of a hardware configuration of the display apparatus according to the exemplary embodiment of the disclosure.

A hardware configuration of the display apparatus 2 according to the present embodiment is described with reference to FIG. 3. The display apparatus 2 has a configuration of an information processing apparatus or a computer as illustrated in FIG. 3. FIG. 3 is a block diagram illustrating an example of the hardware configuration of the display apparatus 2. As illustrated in FIG. 3, the display apparatus 2 includes a central processing unit (CPU) 201, a read only memory (ROM) 202, a random access memory (RAM) 203, and a solid state drive (SSD) 204.

The CPU 201 controls overall operation of the display apparatus 2. The ROM 202 stores a control program such as an initial program loader (IPL) to boot the CPU 201. The RAM 203 is used as a work area for the CPU 201.

The SSD 204 stores various data such as an operating system (OS) and a program for the display apparatus 2. The program may be an application program that runs on an information processing apparatus equipped with a general-purpose OS such as WINDOWS, MAC OS, ANDROID, and IOS. In this case, the display apparatus 2 is usually used as a general-purpose information processing apparatus. However, when a user executes an installed application program, the display apparatus 2 receives handwriting, or hand drafted input, performed by the user similarly to a dedicated display apparatus.

The display apparatus 2 further includes a display controller 213, a touch sensor controller 215, a touch sensor 216, a display 220, a power switch 227, a tilt sensor 217, a serial interface 218, a speaker 219, a microphone 221, a wireless communication device 222, an infrared interface (I/F) 223, a power control circuit 224, an alternating current (AC) adapter 225, and a battery 226.

The display controller 213 controls display of an image for output to the display 220, etc. The touch sensor 216 detects that the pen 2500, a user's hand or the like is brought into contact with the display 220. The pen or the user's hand is an example of input device. The touch sensor 216 also receives a pen identifier (ID).

The touch sensor controller 215 controls processing of the touch sensor 216. The touch sensor 216 performs coordinate input and coordinate detection. A method of inputting and sensing coordinates is described. For example, in a case of optical sensing, two light receiving and emitting devices disposed on both upper side ends of the display 220 emit infrared ray (a plurality of lines of light) in parallel to a surface of the display 220. The infrared ray is reflected by a reflector provided around the display 220, and two light receiving and emitting devices receive light returning along the same optical path as that of lite emitted a light-receiving element a light-receiving element by a light-receiving element.

The touch sensor 216 outputs position information of the infrared ray that is blocked by an object after being emitted from the two light receiving and emitting devices, to the touch sensor controller 215. Based on the position information of the infrared ray, the touch sensor controller 215 detects a specific coordinate that is touched by the object. The touch sensor controller 215 further includes a communication unit 215a for wireless communication with the pen 2500. For example, when communication is performed in compliance with a standard such as BLUETOOTH, a commercially available pen can be used. If one or more pens 2500 are registered in the communication unit 215a in advance, the display apparatus 2 and the pen 2500 communicates with each other without the user's manual operation of configuring connection settings between the pen 2500 and the display apparatus 2.

The power switch 227 turns on or off the power of the display apparatus 2. The tilt sensor 217 detects the tilt angle of the display apparatus 2. The tilt sensor 217 is mainly used to detect whether the display apparatus 2 is being used in any of the states in FIG. 2A, 2B, or 2C. For example, the display apparatus 2 automatically changes the thickness of characters or the like depending on the detected state.

The serial interface 218 is an interface to connect the display apparatus 2 to extraneous sources such as a universal serial bus (USB). The serial interface 218 is used to input information from extraneous sources. The speaker 219 is used to output sound, and the microphone 221 is used to input sound. The wireless communication device 222 communicates with a terminal carried by the user and relays the connection to the Internet, for example.

The wireless communication device 222 performs communication in compliance with, for example, Wi-Fi or BLUETOOTH. Any suitable standard can be applied other than the Wi-Fi and BLUETOOTH. The wireless communication device 222 forms an access point. When a user sets a service set identifier (SSID) and a password that the user obtains in advance in the terminal carried by the user, the terminal is connected to the access point.

It is preferable that two access points are provided for the wireless communication device 222 as follows:
(a) Access point to the Internet; and (b) Access point to Intra-company network to the Internet. The access point (a) is for users other than, for example, company staffs. The access point (a) does not allow access from such users to the intra-company network, but allow access to the Internet. The access point (b) is for intra-company users and allows such users to access the intra-company network and the Internet.

The infrared I/F 223 detects another display apparatus 2 provided adjacent to the own display apparatus 2. The infrared I/F 223 detects an adjacent display apparatus 2 using the straightness of infrared rays. Preferably, one infrared I/F 223 is provided on each side of the display apparatus 2. This configuration allows the display apparatus 2 to detect a direction in which an adjacent display apparatus 2 is arranged. Such arrangement extends the screen. Accordingly, the user can instruct the adjacent display apparatus 2 to display a previous handwritten object. In other words, one display 220 (screen) corresponds to one page, and the adjacent display 220 displays the handwritten object on a separate page.

The power control circuit 224 controls the AC adapter 225 and the battery 226, which are power supplies of the display apparatus 2. The AC adapter 225 converts alternating current shared by a commercial power supply into direct current.

In a case where the display 220 is a so-called electronic paper, little or no power is consumed to maintain display of an image, and the display apparatus 2 may be driven by the battery 226, accordingly. This allows the display apparatus 2 to be used as, for example, a digital signage that is also usable in a place, such as a place in the open air, where a power source is hardly secured.

The display apparatus 2 further includes a bus line 210. The bus line 210 is an address bus or a data bus that electrically connects the elements illustrated in FIG. 3, such as the CPU 201, to each other.

The touch sensor 216 is not limited to the optical sensing, but may use, for example, a capacitance touch panel that identifies a contact position by detecting a change in capacitance. Further, the touch sensor 216 may use a resistance film touch panel that identifies a contact position by a change in voltage of two opposing resistance films. In another example, the touch sensor 216 may use an electromagnetic induction touch panel that identifies a contact position by detecting electromagnetic induction caused by contact of an object to the display, or may use various sensing devices. The touch sensor 216 can be a type that does not use an electronic pen to detect whether the pen tip is in contact with the surface of the display 220. In this case, a fingertip or a pen-shaped stick is used for touch operation. In addition, the pen 2500 may have any suitable shape other than a slim pen shape.

Functions

Figure 4:
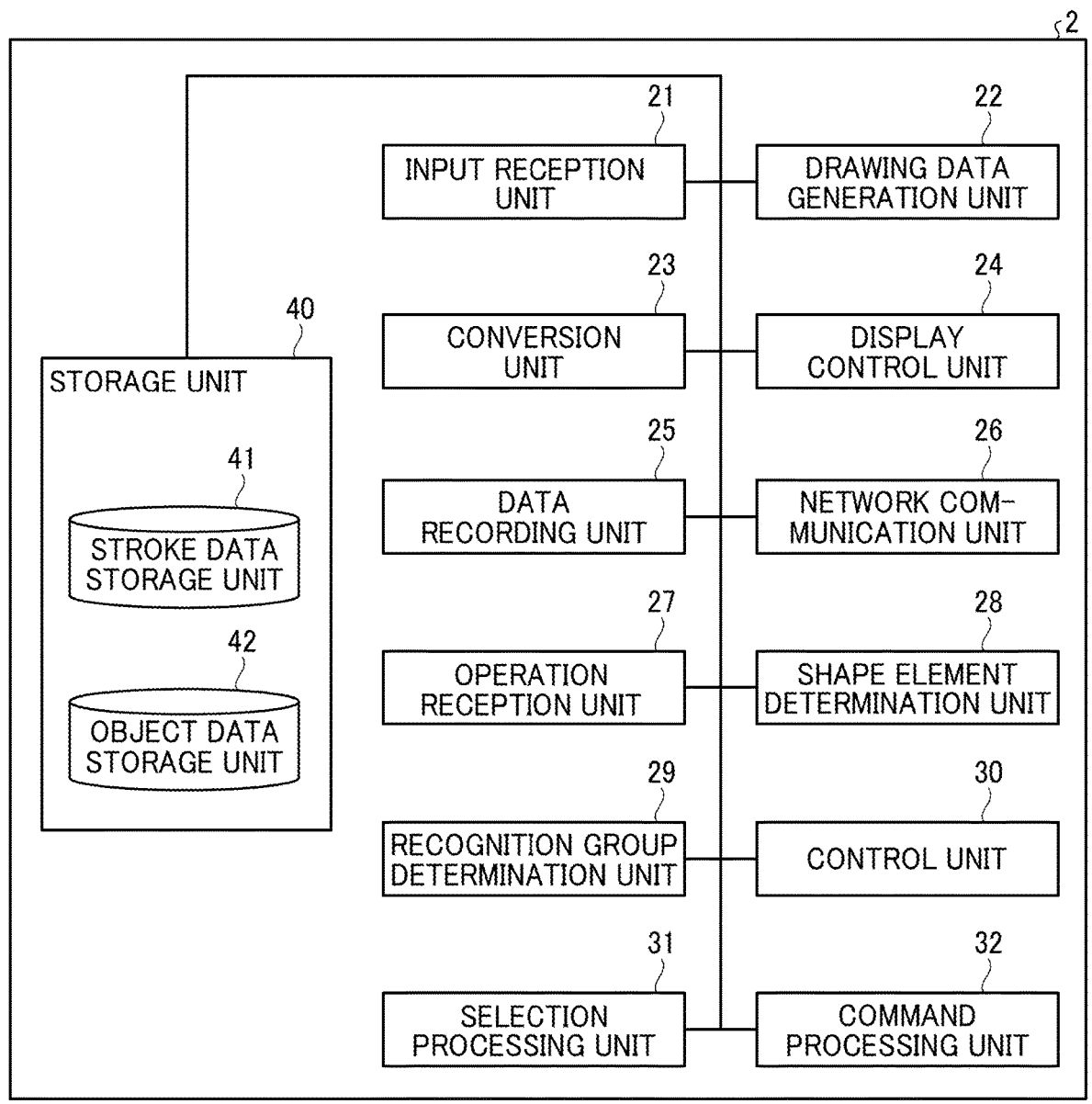
FIG. 4 is a block diagram illustrating a functional configuration of the display apparatus according to the exemplary embodiment of the disclosure.

A functional configuration of the display apparatus 2 according to the present embodiment is described below with reference to FIG. 4. FIG. 4 is a block diagram illustrating an example of the functional configuration of the display apparatus 2 according to the present embodiment. The display apparatus 2 includes an input reception unit 21, a drawing data generation unit 22, a conversion unit 23, a display control unit 24, a data recording unit 25, a network communication unit 26, an operation reception unit 27, a shape element determination unit 28, a recognition group determination unit 29, a control unit 30, a selection processing unit 31, and a command processing unit 32. The functional units of the display apparatus 2 are implemented by or are caused to function by operation of any of the components illustrated in FIG. 3 according to an instruction from the CPU 201 according to a program loaded from the SSD 204 to the RAM 203.

The input reception unit 21 receives an input of trajectory of coordinates (coordinate point sequence, hand drafted input data) by detecting coordinates of a position at which an input means, or an input device, such as the pen 2500 contacts the touch sensor 216. The drawing data generation unit 22 acquires coordinates of each position touched by the pen tip of the pen 2500 from the input reception unit 21. The drawing data generation unit 22 connects a plurality of contact coordinates into a coordinate point sequence by interpolation, to generate stroke data.

The conversion unit 23 performs character recognition processing on one or more pieces of stroke data (hand drafted data), namely the stroke data corresponding to one or more strokes, input by a hand drafted input operation of the user and converts the stroke data into text. The text is a character code. The conversion unit 23 recognizes characters (of multilingual languages such as English as well as Japanese), numbers, symbols (e.g., %, $, and &) concurrently with a pen operation by the user. In addition, the conversion unit 23 performs shape recognition processing on one or more pieces of stroke data (hand drafted data) input by a hand drafted input operation of the user and converts the stroke data into a shape (e.g., line, circle, and triangle). Although various algorithms have been proposed for the recognition method, a detailed description is omitted on the assumption that known techniques can be used in the present embodiment.

The display control unit 24 displays, on the display 220, for example, hand drafted data, a character string converted from the hand drafted data, and an operation menu to be operated by the user. The data recording unit 25 stores hand drafted data input on the display apparatus 2, a converted character string, a screenshot on a personal computer (PC) screen, a file, and the like in a storage unit 40. The network communication unit 26 connects to a network such as a local area network (LAN), and transmits and receives data to and from other devices via the network.

The operation reception unit 27 receives selection of a particular character from a plurality of conversion candidates in relation to character recognition based on the coordinates at which the pen 2500 is in contact, or receives pressing of a menu.

The shape element determination unit 28 determines whether a stroke being a shape element has been input or not. The shape element includes a stroke that is an element of such as a side of a shape. In other words, the shape element determination unit 28 determines whether the stroke satisfies the condition 1 described above or not.

The recognition group determination unit 29 determines whether a plurality of strokes is included in the same recognition group for a shape or not. In other words, the recognition group determination unit 29 determines whether the plurality of strokes satisfies the condition 2 described above or not.

The control unit 30 determines whether a converted shape is the object selecting shape 10 that is preset. The control unit 30 starts the selection mode in which selection of a displayed object is received using a shape obtained by recognition by the conversion unit 23. The control unit 30 is an example of a determination unit.

The selection processing unit 31 performs processing related to capturing an object selected by the user. The processing related to the capturing includes causing image data within an area enclosed by a shape or object data included in the area to be a selected state. Capturing is not limited to storing object data, and may include selecting, copying, cutting, or moving an object, for example.

When the text converted by the conversion unit 23 partially matches a preset command, the command processing unit 32 displays the command on the operation guide 500. When the command is selected, processing determined for each command is executed. The processing includes, for example, pasting the image data or the object data that is captured.

The display apparatus 2 includes the storage unit 40 implemented by, for example, the SSD 204 or the RAM 203 illustrated in FIG. 3. The storage unit 40 includes a stroke data storage unit 41 and an object data storage unit 42.

FIGS. 5A, 5B, and 5C are diagrams illustrating data related to stroke data stored in the stroke data storage unit 41. FIG. 5A is a conceptual diagram illustrating page data. The page data is data of one page displayed on the display 220. As illustrated in FIG. 5A, the page data includes data items of page data ID for identifying a page, start time indicating the time at which display of the page is started, end time indicating the time at which hand drafted input to the page is stopped, and stroke arrangement data ID for identifying data on an arrangement of strokes made by an input device, in association with one another. In FIG. 5A, text data, image data, tables, graphics, and the like after character recognition are omitted.

The stroke arrangement data is to be used for displaying a stroke data item on the display 220. For example, when the user draws an alphabet "S" with an input device in one stroke, one stroke data ID is assigned to the alphabet "S" to be identified. When the user draws an alphabet "T" with an input device in two strokes, two stroke data IDs are assigned to the alphabet "T" to be identified.

The stroke arrangement data includes detailed information as illustrated in FIG. 5B. FIG. 5B is a conceptual diagram illustrating a data structure of the stroke arrangement data. A piece of stroke arrangement data includes a plurality of records of stroke data. A piece of stroke data includes a stroke data ID for identifying the piece of stroke data, a start time when drawing of a corresponding stroke is started, an end time when drawing of the corresponding stroke is ended, a color of the corresponding stroke, a width of the corresponding stroke, a recognition group, a type, and a coordinate array data ID for identifying arrangement of points of the corresponding stroke.

The recognition group is identification information for the same recognition group of which the hand drafted data is collectively converted into text. The type indicates what kind of element the stroke data is determined to have, for example, a part of text or shape. The type may include "stroke" as it is (hand drafted data). The hand drafted data, converted text, shape, or the like is stored as object data.

Further, the coordinate array data includes detailed information as illustrated in FIG. 5C. FIG. 5C is a conceptual diagram illustrating a data structure of the coordinate array data. As illustrated in FIG. 5C, the coordinate array data includes a point (X coordinate value and Y coordinate value) on the display 220, time difference (milliseconds) from the start of drawing of the stroke to when the stroke passes that point, and drawing pressure by the pen 2500 on that point. In other words, one coordinate array data in FIG. 5B is a collection of one-point data in FIG. 5C. For example, in case in which a user draws the alphabet "S" with the input device in one stroke, the stroke passes a plurality of points. Accordingly, the coordinate array data indicates those passing points in drawing of the stroke.

Figures 6, 7:
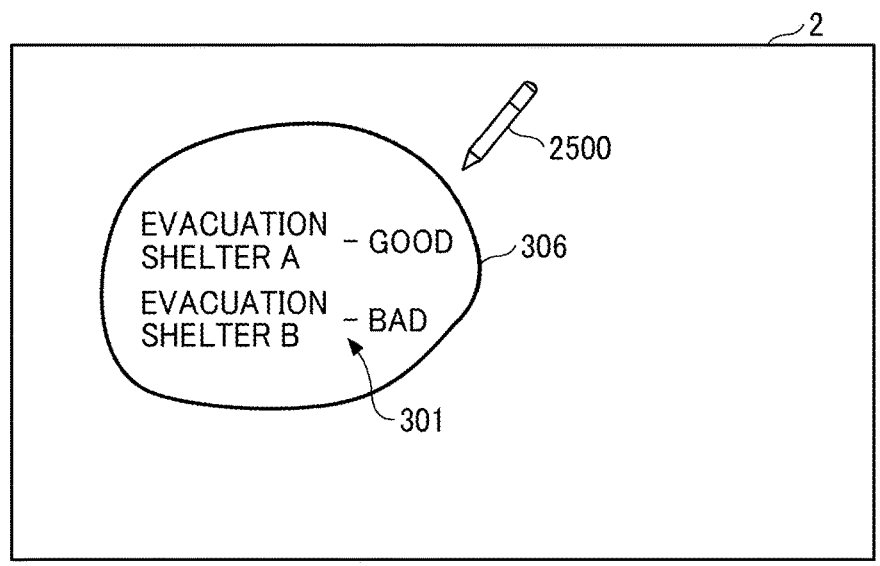
FIG. 6 is a diagram illustrating data related to object data stored in an object data storage unit according to the exemplary embodiment of the disclosure.
FIG. 7 is a diagram illustrating an example of selecting an object by a stroke, according to the exemplary embodiment of the disclosure.

FIG. 6 is a diagram illustrating data related to object data stored in the object data storage unit 42 according to the present embodiment.

An item of object ID is identification information for identifying display data.

An item of type is a type of object data, and includes hand drafted, text, shape, image, and table, for example. "Hand drafted" indicates stroke data (coordinate point sequence). "Text" indicates a character string (character code) converted from handwritten data. "Shape" indicates a geometric shape, such as a triangle and a quadrangle, converted from hand drafted data. "Image" indicates image data in a format such as Joint Photographic Experts Group (JPEG), Portable Network Graphics (PNG), or Tagged Image File Format (TIFF) acquired from, for example, a PC or the Internet. "Table" indicates a one dimensional or two dimensional table object.

A single screen of the display apparatus 2 is referred to as a page. An item of page indicates a page number.

An item of coordinates indicates a position of object data with reference to a predetermined origin on a screen of the display apparatus 2. The position of the object data is, for example, the upper left apex of a circumscribed rectangle of the object data. The coordinates are expressed, for example, in pixels of the display.

An item of size indicates a width and a height of a circumscribed rectangle of the object data.

Example of Object Selection

FIG. 7 is a diagram illustrating an example of selecting an object by a stroke. In FIG. 7, the object 301 including two objects is the object 301 that is desired to be selected by the user.

The two objects are "EVACUATION SHELTER A—GOOD" and "EVACUATION SHELTER B—BAD"

A stroke 306 is input by hand drafted input of the user and represents a circle enclosing the object 301 including the two objects. When the display apparatus 2 according to the present embodiment recognizes the stroke 306 as a shape, the selection mode for the two objects starts. Although the object 301 including the two objects is enclosed with a circle in FIG. 7, the object selecting shape 10 may be a polygon in the embodiment. The object selecting shape 10 is set in advance. The object selecting shape 10 may be a triangle, a rectangle, or a polygon, for example. The object selecting shape 10 may be settable by the user.

The object to be selected by the object selecting shape 10 may be any displayed object such as hand drafted data, text, a shape, an image displayed from a file or a part of a file (e.g., a portable document format (PDF) file).

Determination for Shape Element; Condition 1

Figure 8A:
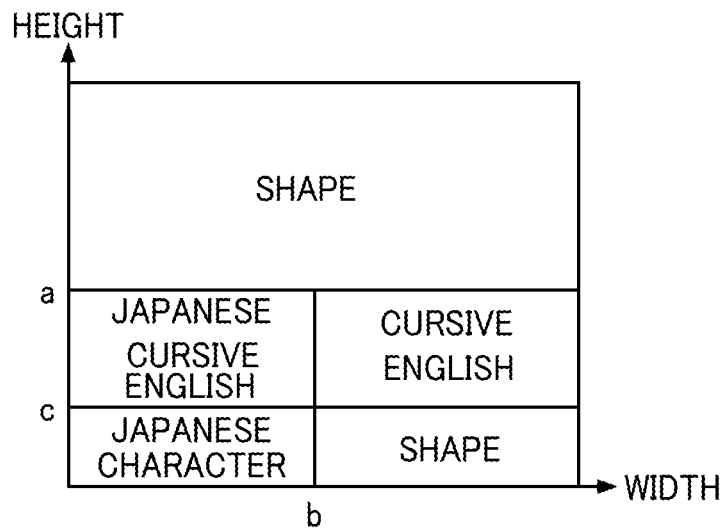
FIGS. 8A to 8C are diagrams illustrating correspondence between a stroke size and a recognized object, according to the exemplary embodiment of the disclosure.
Figure 8B:
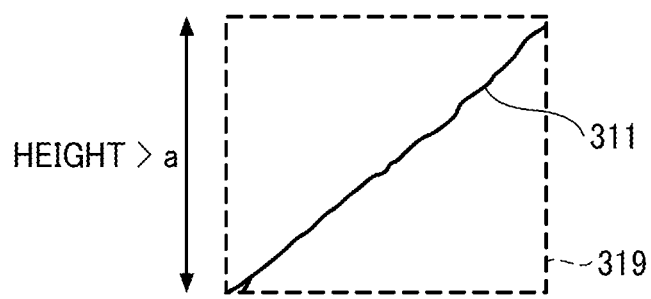
Figure 8C:
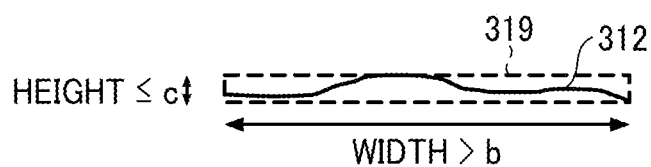

FIGS. 8A to 8C are diagrams illustrating correspondence between a stroke size and a recognized object. The stroke size may be, for example, a circumscribed rectangle of the stroke. FIG. 8A illustrates that a stroke is recognized as a shape (graphic), a Japanese character, or English in cursive depending on a combination of a width and a height of the stroke. As illustrated in FIG. 8A, the condition 1 for shape elements is as follows.

Condition 1

The height of the stroke is greater than "a." This means that "a" that is estimated as the maximum value of the height of a character is set to a threshold value, and a stroke having a height exceeding the threshold value is determined as a shape element.

The width of the stroke is greater than "b" and the height of the stroke is equal to or less than "c." This means that "b" that is estimated as the maximum value of the width of a character is set to a threshold value, and a stroke having a width exceeding the threshold value is determined as a shape element, and "c" that is estimated as the maximum value of a height of a horizontal line is set to a threshold value and a stroke equal to or less than the threshold value is determined as a shape element.

In addition, the example of FIG. 8A, a stroke having a width>"b" and a height≤"a" is determined to be cursive English. A stroke having a width≤"b" and a height<"a" is determined to be a Japanese or cursive English.

FIG. 8B is a diagram illustrating an example of a stroke 311 that is determined as a shape element. The height of the stroke 311 is the height of a circumscribed rectangle 319. In the example of FIG. 8B, since the height of the stroke 311 is greater than "a," the stroke 311 is determined as a shape element.

FIG. 8C is a diagram illustrating an example of a stroke 312 that is determined as a shape element. The height and the width of the stroke 312 are the height and the width of a circumscribed rectangle 319. In the example of FIG. 8C, since the height of the stroke 312 is less than or equal to "c" and the width of the stroke 312 is greater than "b," the stroke 312 is determined as a shape element.

Determination Method for Same Recognition Group; Condition 2

Figure 9:
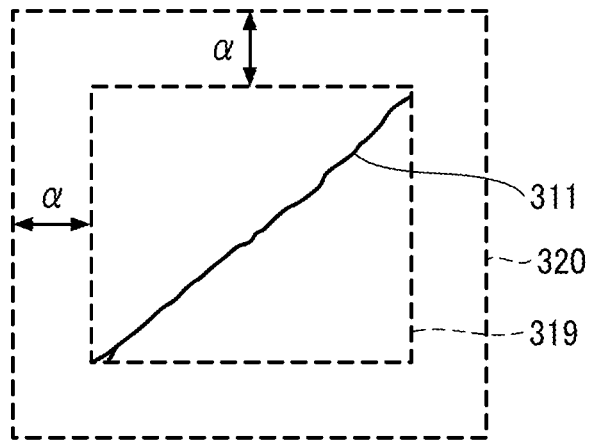
FIG. 9 is a diagram illustrating an example of a neighborhood rectangle according to the exemplary embodiment of the disclosure.

A method for determining the same recognition group is described with reference to FIG. 9 and FIG. 10. First, a neighborhood rectangle is described. FIG. 9 is a diagram illustrating an example of a neighborhood rectangle. The recognition group determination unit 29 sets a neighborhood rectangle 320 that is a rectangle obtained by adding α (offset) to each of upper, lower, left, and right sides of the circumscribed rectangle 319 of the stroke 311 as illustrated in FIG. 9.

A specific example case is described below using example values.

In a case of an offset fixed value α=3 cm, the width of the stroke 311 is 15 cm, and the height is 13 cm, the neighborhood rectangle 320 is as follows.

Width: α+(width of the stroke 311)=18 cm

Height: α+(height of the stroke 311)=16 cm

The fixed offset value may vary depending on the size of the display, the number of pixels of the display, and the intended use of the display. The values described above are examples, and may be suitable for a size of hand drafted data in a case where a 40-inch display (2880×2160 pixels) is shared by several users. In the example of FIG. 9, as the fixed offset values for the width and the height, the same value is used, but the fixed offset values for the width and the height may be different from each other.

Figure 10:
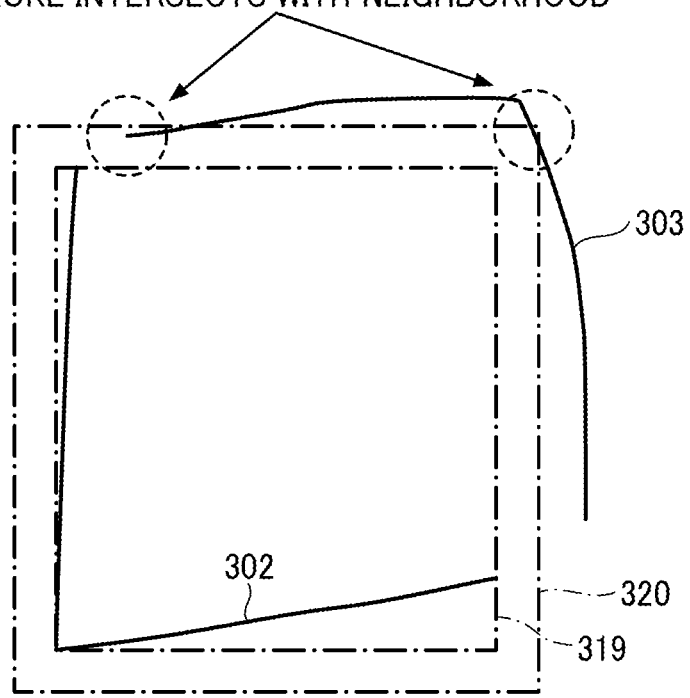
FIG. 10 is a diagram illustrating an example of a plurality of strokes determined to belong to the same recognition group according to the exemplary embodiment of the disclosure.

FIG. 10 is a diagram illustrating an example of a plurality of strokes determined to belong to the same recognition group. Whether the plurality of strokes belongs to the same recognition group or not is determined according to condition 2.

Condition 2

The condition 2 is that the stroke 303, which is different from the stroke 302 satisfying the condition 1 intersects with a neighborhood rectangle 320 of the stroke 302. The stroke 303 also satisfies the condition 1. In the example of FIG. 10, the stroke 302 is input by hand drafted input and the stroke 302 is determined as a shape element. The recognition group determination unit 29 sets the neighborhood rectangle 320 for a circumscribed rectangle 319 of the stroke 302. Next, the user input the stroke 303 by hand drafted input. The stroke 303 satisfies the condition 1 and intersects the neighborhood rectangle 320. Accordingly, the recognition group determination unit 29 determines that the stroke 302 and the stroke 303 belong to the same recognition group.

Then, the pair of strokes 302 and 303 is determined to be a square or a rectangle by being compared to a shape list. Although the pair of strokes 302 and 303, which is input as a rectangular shape by hand drafted input is described with reference to FIG. 10, a neighborhood rectangle is similarly set for a stroke satisfying the condition 1, and the condition 2 is similarly determined.

Comparison with Shape; Condition 3

Figure 11:
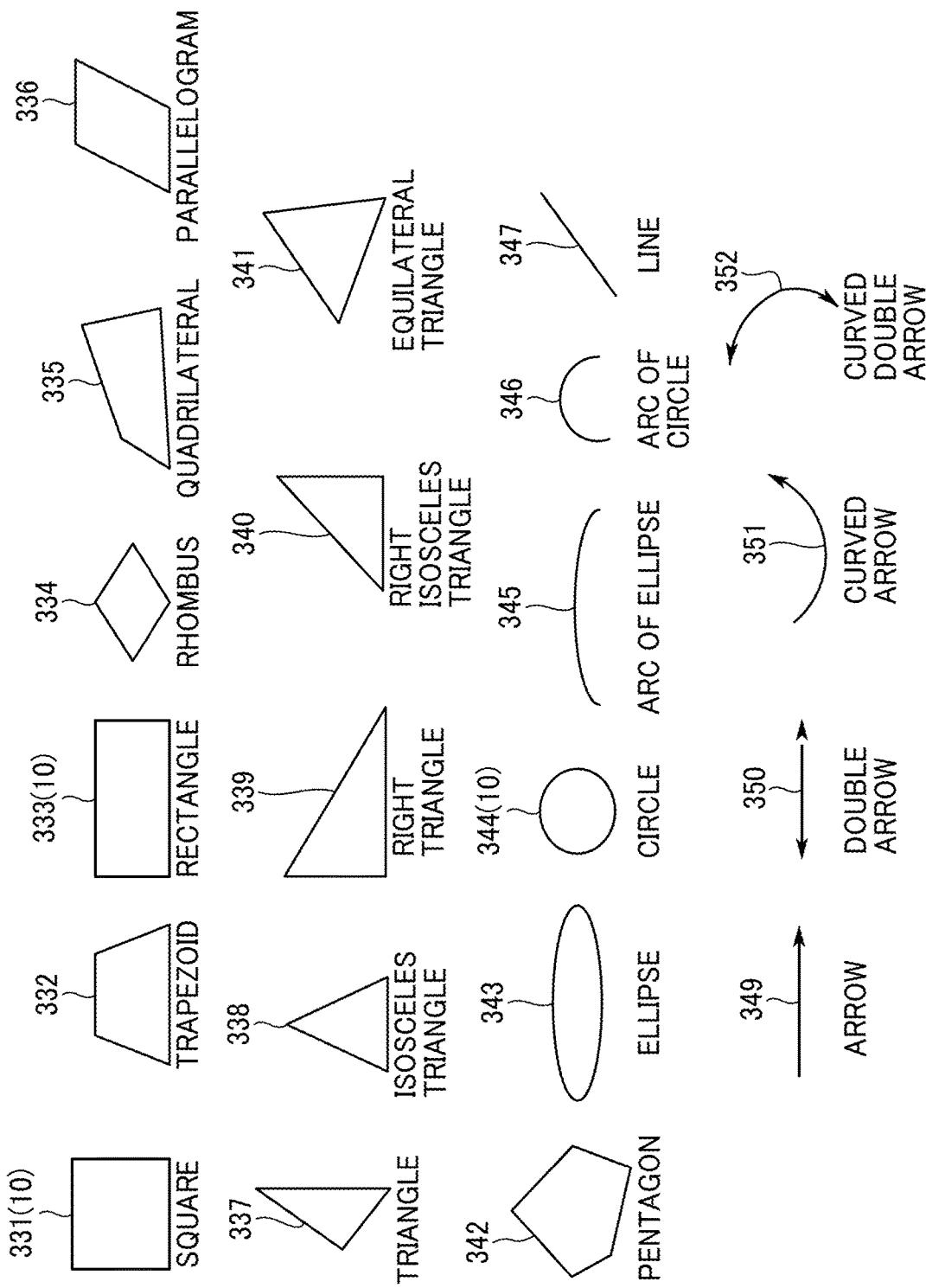
FIG. 11 is a diagram illustrating an example of a shape list set in advance for a conversion unit according to the exemplary embodiment of the disclosure.

The condition 3, comparing between a shape and an outline, or a line shape, of a stroke is described with reference to FIG. 11. FIG. 11 is a diagram illustrating an example of a list of shapes into each of which one or more strokes can be converted by the conversion unit 23 performing recognition on the one or more strokes. The list of shapes may be referred to as a shape list. Among them, each of a circle 344 and rectangles (a square 331 and a rectangle 333) is determined in advance as the object selecting shape 10.

Condition 3

The condition 3 is that an outline, or a line shape, of one or more strokes belonging to the same recognition group can be presumed as a shape. The shape also includes the object selecting shape 10. The first row of FIG. 11 is for shapes of quadrangle that are the square 331, a trapezoid 332, the rectangle 333, a rhombus 334, a quadrilateral 335, and a parallelogram 336. Among the quadrangles, each of the square 331 and the rectangle 333 is the object selecting shape 10. The second row is for shapes of triangle 337 to 341. The third row is for shapes of a pentagon 342, an ellipse 343, the circle 344, an arc of ellipse 345, an arc of circle 346, and a line 347. The circle 344 is the object selecting shape 10. The fourth row includes a single headed arrow (arrow) 349, a double arrow 350, a curved arrow 351, and a curved double arrow 352. When the conversion unit 23 determines that an outline, or a line shape, of the one or more strokes, which belong to the same recognition group and satisfy the conditions 1 and 2 is similar to a circle or a rectangle, the control unit 30 starts the selection mode.

As one method of comparing a shape to an outline or a line shape of a plurality of strokes (one or more strokes) determined to belong to the same recognition group, for example, there is a method of performing pattern matching between the outline or the line shape of the plurality of strokes (one or more strokes) and each shape in the shape list. As another example, there is a method using machine learning. An information processing apparatus previously learns correspondence between an image of one or more strokes for each shape and the corresponding shape in the shape list by machine learning such as a neural network to create a shape determination model. The shape determination model outputs a probability corresponding to each shape for the image of the one or more strokes. The conversion unit 23 inputs the images of a plurality of strokes (one or more strokes) determined to belong to the same recognition group to the shape determination model, and determines some shapes having higher probabilities as shape conversion candidates 11 in the operation guide 500. The object selecting shape 10 may be included as some of the shape conversion candidates 11.

The machine learning is a technique for causing a computer to acquire human-like learning capability, and refers to a technique in which a computer autonomously generates an algorithm necessary for determination of data identification or the like from learning data acquired in advance, and applies the algorithm to new data to perform prediction. Any suitable learning method is applied for machine learning, for example, any one of supervised learning, unsupervised learning, semi-supervised learning, reinforcement learning, and deep learning, or a combination of two or more those learning. Machine learning methods include, but not limited to, perceptron, support vector machine, logistic regression, naïve Bayes, decision tree, and random forest.

Figure 12:
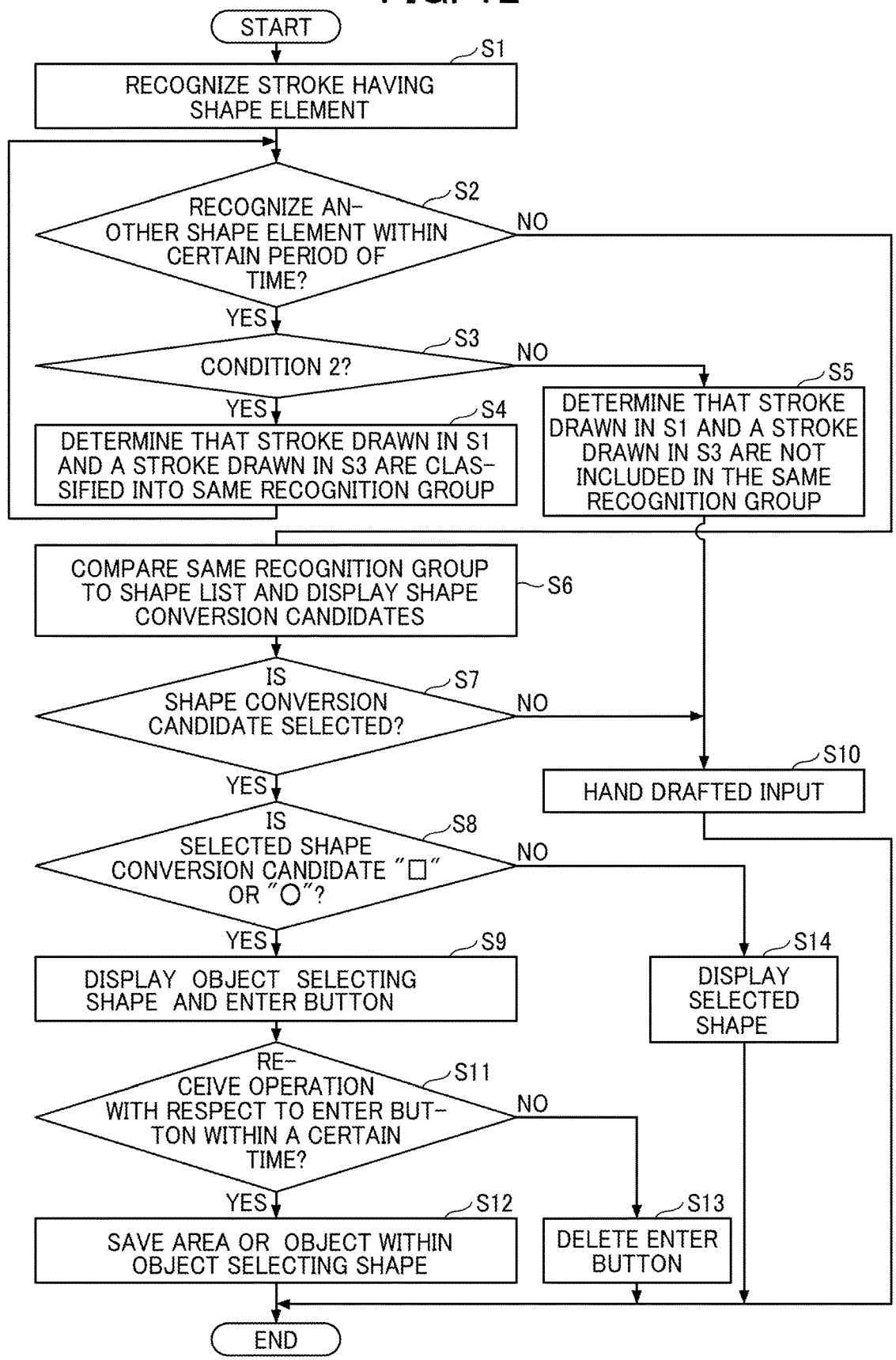
FIG. 12 is a flowchart illustrating a process, performed by the display apparatus, for determining whether one or more strokes are included in the same recognition group for a shape, according to the exemplary embodiment of the disclosure.

Determination Processing for Whether Same Recognition Group Referring to FIG. 12, a process, performed by the display apparatus 2, for determining whether one or more strokes are included in the same recognition group for a shape or not is described. FIG. 12 is a flowchart illustrating a process, performed by the display apparatus 2, for determining whether one or more strokes are included in the same recognition group for a shape or not. The process of FIG. 12 starts when a stroke is input by hand drafted input. In the example of FIG. 12, the object selecting shape 10 is a circle or a rectangular shape (rectangle, square).

First, the shape element determination unit 28 detects that a stroke 1 satisfying the condition 1 is input by hand drafted input (S1). More specifically, the shape element determination unit 28 determines whether the stroke 1 satisfying the condition 1 is input by hand drafted input or not. Details of the processing of step S1 is described later with reference to FIG. 13.

In addition, the shape element determination unit 28 determines whether a stroke 2, which is determined to be a shape element, is input by hand drafted input before a predetermined period of time elapses after the stroke 1 is input by hand drafted input (S2).

When the determination in step S2 is Yes, the recognition group determination unit 29 determines whether the stroke 2 intersects a neighborhood rectangle of the stroke 1 or not, in other words whether the condition 2 is satisfied or not (S3).

When the determination in step S3 is Yes, the recognition group determination unit 29 determines that the stroke 1 and the stroke 2 belong to the same recognition group (S4).

If the determination in step S3 is No, the recognition group determination unit 29 does not determine that the stroke 1 and the stroke 2 belong to the same recognition group (S5). In this case, the process proceeds to step S10.

When a plurality of strokes is determined to belong to the same recognition group, the conversion unit 23 compares an outline or a line shape of the plurality of strokes determined to belong to the same recognition group to the shape list, and the display control unit 24 causes the operation guide 500 to display several shape conversion candidates 11 each of which has similarity equal to or higher than threshold (S6). The shape conversion candidate 11 may include one other than the object selecting shape 10. For example, when the user draws a trapezoid by hand drafted input, a trapezoid, a rectangle, and a square may be displayed as the shape conversion candidates. The rectangle and the square are included in the object selecting shape 10, but the trapezoid is not the object selecting shape 10. Since the character is excluded in step S1, character candidates are not displayed in the operation guide 500.

The control unit 30 determines whether the shape conversion candidate 11 is selected from the operation guide 500 (S7).

When the shape conversion candidate 11 is not selected, namely nothing is selected, the strokes of the same recognition group are fixed as hand drafted data (S10).

When the shape conversion candidate 11 is selected, the control unit 30 determines whether the selected shape is the object selecting shape 10 (circle or rectangle) or not (S8). When the determination in step S8 is No, the process proceeds to step S14.

When the selected shape is the object selecting shape 10 (Yes in S8), the display control unit 24 displays the object selecting shape 10 and the enter button 305 (S9).

The control unit 30 determines whether the enter button 305 has been pressed within a predetermined period of time from the start of displaying the enter button 305 (S11). In the predetermined period of time, the user can adjust the object selecting shape 10 so that an object desired to be selected is included in the object selecting shape 10 by moving, enlarging, or reducing the object selecting shape 10. The operation reception unit 27 receives movement, enlargement, or reduction of the object selecting shape 10. In addition, measurement of the predetermined period of time is stopped while the user drags the object selecting shape 10 with the pen 2500. Accordingly, while the operation reception unit 27 receives the change of the size and the position of the object selecting shape 10, the display control unit 24 does not delete the enter button 305 even after the predetermined period of time has elapsed.

When the determination in step S11 is Yes, the selection processing unit 31 selects image data or an object in an area enclosed by the object selecting shape 10 (S12). The selected object turns to be a selected state and is further stored.

When the determination in step S11 is No, the display control unit 24 deletes the enter button 305 after the predetermined period of time has elapsed (S13). In this case, although the object selecting shape 10 is displayed, but not used for selecting an object. Further, the control unit 30 ends the selection mode. The object selecting shape 10 is continuously displayed, but disable to select an object by the user.

In step S14, a shape (for example, trapezoid) other than the object selecting shape 10 is displayed (S14).

Determination for Shape Element

Figure 13:
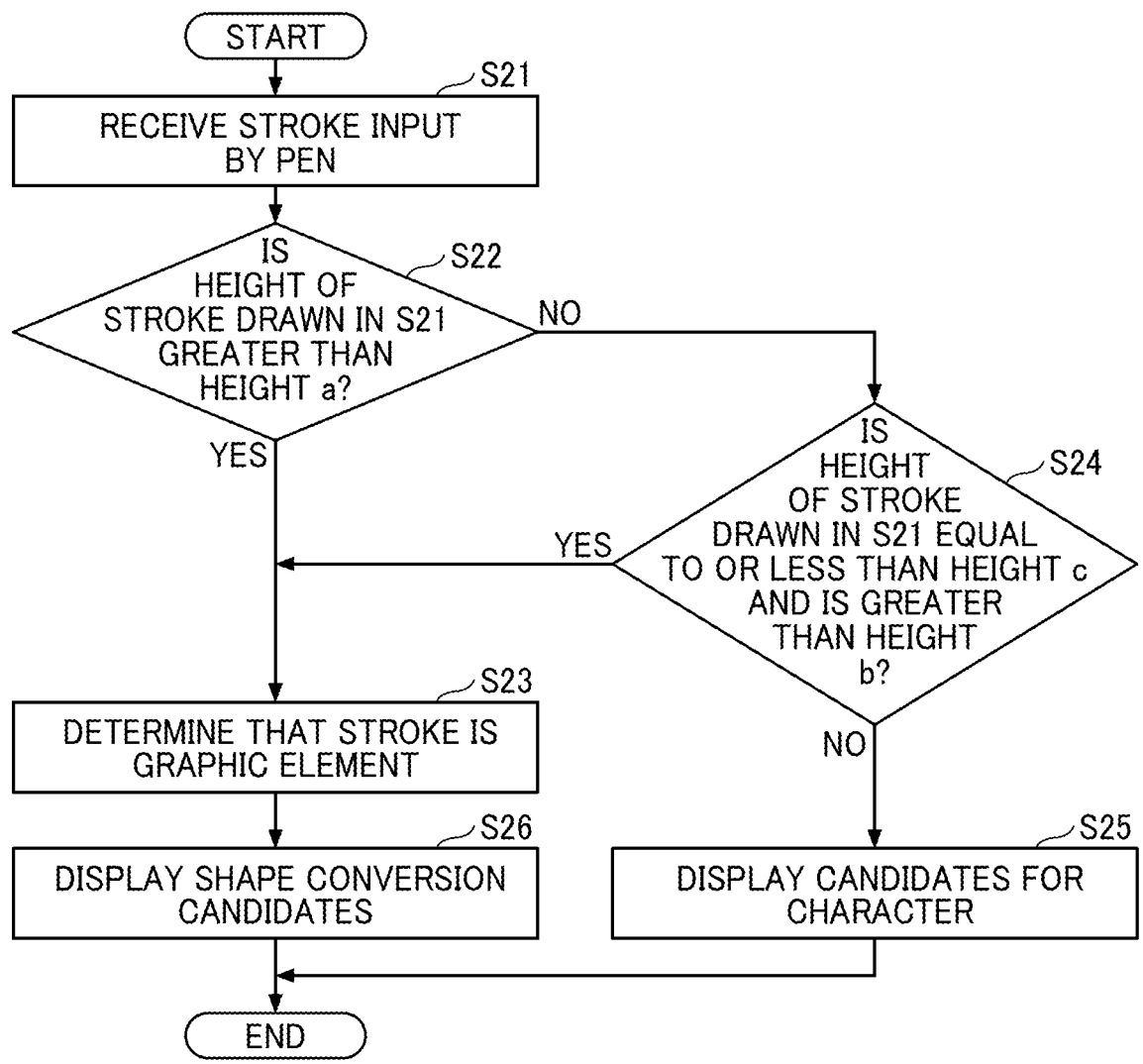
FIG. 13 is a flowchart illustrating a process performed by the display apparatus for determining whether a stroke is a shape element, according to the exemplary embodiment of the disclosure.

Referring to FIG. 13, a process for determining whether a stroke is a shape element is described. FIG. 13 is a flowchart illustrating a process performed by the display apparatus 2 for determining whether a stroke is a shape element or not. The process of FIG. 13 is executed in step S1 of FIG. 12.

First, the input reception unit 21 receives input of coordinates input by the pen 2500, and the drawing data generation unit 22 draws a stroke (S21).

The shape element determination unit 28 determines whether the height of the stroke is greater than "a," which is the maximum height for a character (S22).

In a case of the height of the stroke>"a," the shape element determination unit 28 determines that the stroke is a shape element (S23).

In a case of the height of the stroke is not greater than "a," the shape element determination unit 28 determines whether the height of stroke is equal to or less than "c" and the width of the stroke is greater than "b" (S24).

When the determination in step S24 is Yes, the shape element determination unit 28 determines that the stroke is a shape element (S23).

When the stroke is a shape element, the display control unit 24 causes the operation guide 500 to display the shape conversion candidate 11 (S25).

When the determination in step S24 is No, the shape element determination unit 28 determines that the stroke is not a shape element, and thus the display control unit 24 does not display the shape conversion candidate in the operation guide 500 (S26). In this case, for example, candidates for character corresponding to the strokes of the same recognition group are displayed.

Example of Conversion into Shape

Figure 14:
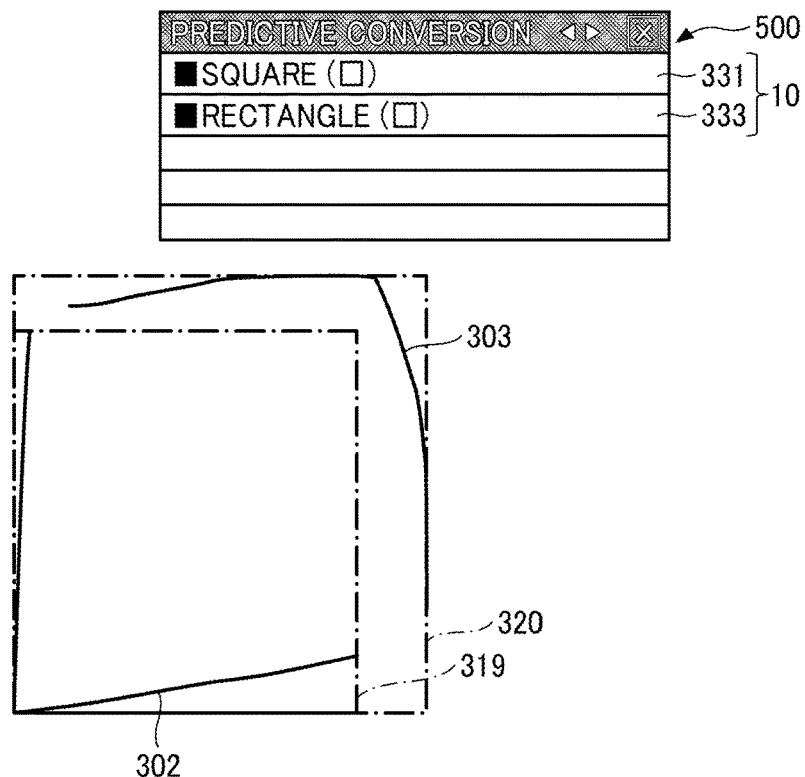
FIG. 14 is a diagram illustrating an example of conversion in which one or more strokes are converted into an object selecting shape (rectangle), according to the exemplary embodiment of the disclosure.

FIG. 14 is a diagram illustrating an example of conversion in which one or more strokes are converted into an object selecting shape (rectangle). Two strokes in FIG. 14 are the same as those in FIG. 10 and satisfy conditions 1 and 2. In addition, regarding the condition 3, the similarity between the outline or the line shape of the pair of strokes 302 and 303 and the object selecting shape 10 (square 331 or rectangle 333) satisfies the threshold value. Accordingly, in the operation guide 500, the square 331 and the rectangle 333 each of which is the object selecting shape 10 are displayed as the shape conversion candidates 11.

Figure 15:
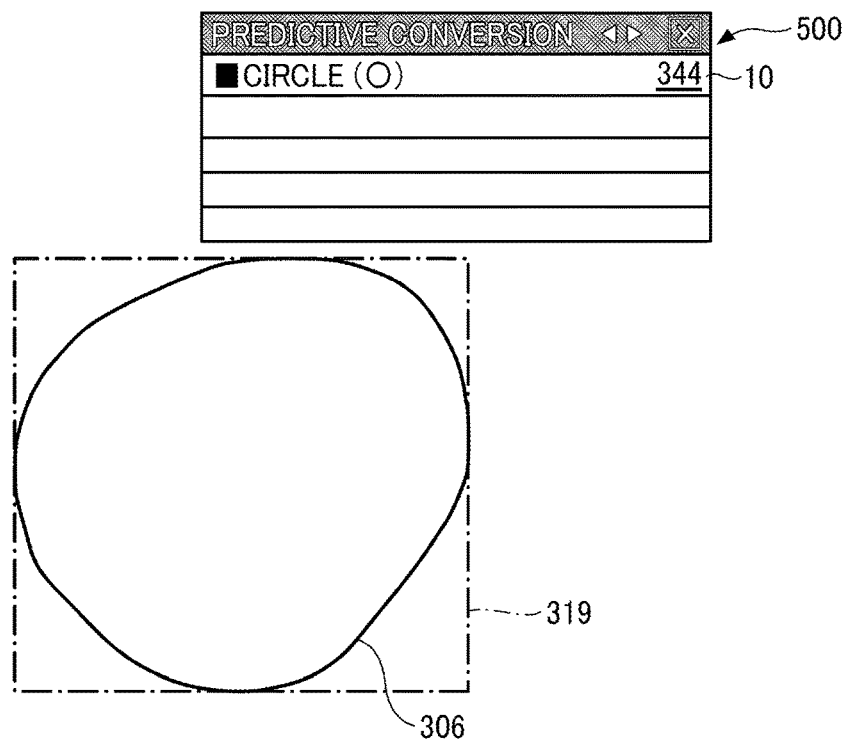
FIG. 15 is a diagram illustrating an example of conversion in which a stroke is converted into an object selecting shape (circle), according to the exemplary embodiment of the disclosure.

FIG. 15 is a diagram illustrating an example of conversion in which a stroke is converted into an object selecting shape (circle). In FIG. 15, a single stroke is input by hand drafted input. Since a stroke 306 alone is input, the condition 2 is not determined. The stroke 306 in FIG. 15 satisfies the condition 1. In addition, regarding the condition 3, the similarity between the outline of the stroke 306 and the object selecting shape 10 (circle 344) satisfies the threshold value. Accordingly, in the operation guide 500, a circle that is the object selecting shape 10 is displayed as the shape conversion candidate 11.

Although the number of strokes is one in the example of FIG. 15, the number of strokes may be two or more for displaying the shape conversion candidate 11 of the circle 344. In other words, as long as an outline or a line shape of a plurality of strokes is similar to the circle in the shape list, the number of strokes is not limited.

In addition, although the operation guide 500 is displayed in the examples of FIGS. 14 and 15, the operation guide 500 may not be displayed. Since the conversion accuracy is not necessarily 100%, the operation guide 500 is displayed for the user to select a final conversion candidate. Accordingly, when the conversion accuracy is high enough not to cause any problem in practical use, the operation guide 500 may not be displayed. For example, the user may set for displaying or hiding the operation guide 500. Alternatively, the operation guide 500 may be displayed when the accuracy at the time of conversion is less than a certain level. When the accuracy at the time of conversion is equal to or higher than the certain level but a shape intended by the user is not displayed, the operation guide 500 may be displayed according to a user operation.

Figure 16:
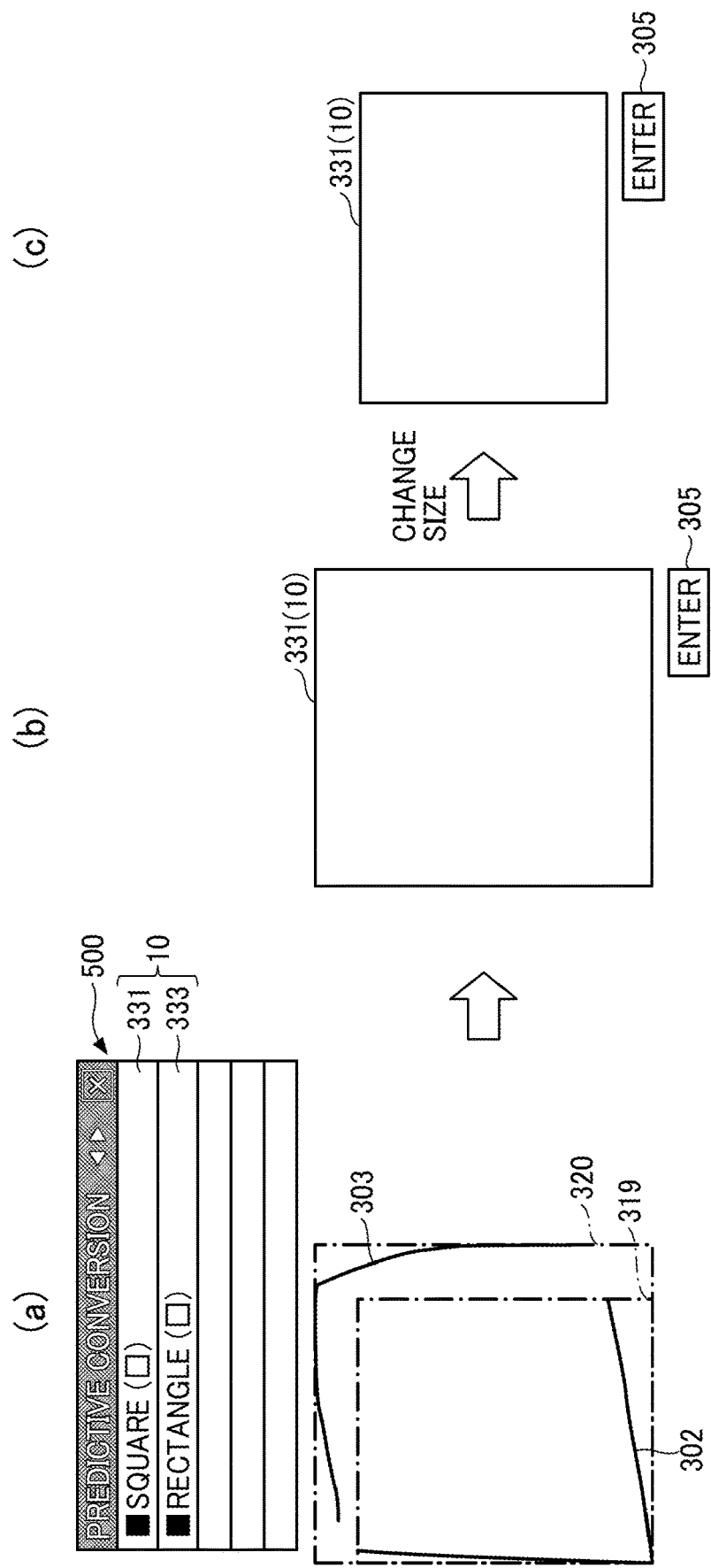
FIG. 16 is a diagram illustrating a case where an object selecting shape corresponding to a square is selected, and the object selecting shape corresponding to the square is displayed, according to the exemplary embodiment of the disclosure.
Figure 17:
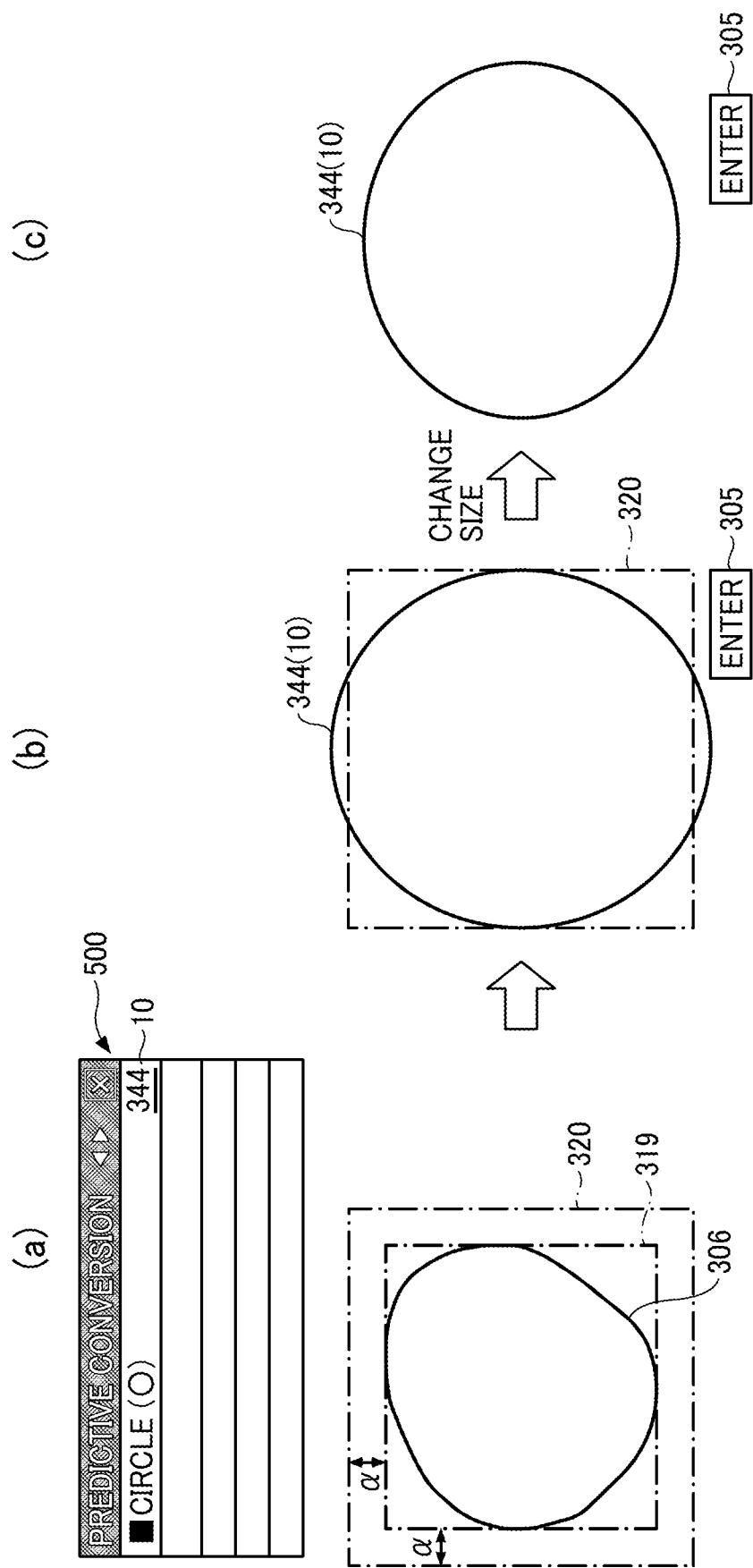
FIG. 17 is a diagram illustrating a case where an object selecting shape corresponding to a circle is selected, and the object selecting shape corresponding to the circle is displayed, according to the exemplary embodiment of the disclosure.

Referring now to FIGS. 16 and 17, a case where the object selecting shape 10 is selected is described. FIG. 16 is a diagram illustrating a case where the object selecting shape 10 corresponding to the square 331 is selected, and the object selecting shape 10 corresponding to the square 331 is displayed. In the example of FIG. 16, (a) is the same as FIG. 14.

When the user selects the object selecting shape 10 in the operation guide 500, as illustrated in (b) of FIG. 16, the display control unit 24 deletes the pair of strokes 302 and 303 and displays a shape (square 331) corresponding to the selected object selecting shape 10. The size of the square 331 is based on a circumscribed rectangle of the pair of strokes 302 and 303 determined to belong to the same recognition group. In addition, the display control unit 24 displays the enter button 305 close to the square 331. The enter button 305 is a button for executing capturing.

When the enter button 305 is not pressed within a predetermined period of time from the display of the enter button 305, the display control unit 24 deletes the enter button 305. In this case, the square 331, which is the object selecting shape 10, is available as a shape, but not used for capturing. As described above, once, the display apparatus 2 allows the user to select whether to perform capturing or not after displaying the shape. Accordingly, inputting a shape and selecting an object can be performed seamlessly.

The size and the shape of the square 331 are changed by the user in (c) of FIG. 16. For example, the user changes the size (enlarge or reduce) or the shape of the square 331 by dragging while pressing a side of the square 331 with the pen 2500.

FIG. 17 is a diagram illustrating a case where the object selecting shape 10 corresponding to the circle 344 is selected, and the object selecting shape 10 corresponding to the circle 344 is displayed. In the example of FIG. 17, (a) is the same as FIG. 15.

When the user selects the object selecting shape 10, as illustrated in (b) of FIG. 17, the display control unit 24 deletes the stroke 306 and displays the circle 344 corresponding to the selected object selecting shape 10. When the object selecting shape 10 is the circle 344, a size of the circle 344 is one that has, as the diameter, a long side of a rectangle obtained by adding α (offset) to each of upper, lower, left, and right sides of the circumscribed rectangle 319 of the stroke 306. The enter button 305 may be substantially the same as that illustrated in FIG. 16.

The size of the circle 344 is changed by the user in (c) of FIG. 17. For example, the user can change the size of the circle 344 by dragging while pressing a portion of the circumference with the pen.

Capturing Processing

Figure 18A:
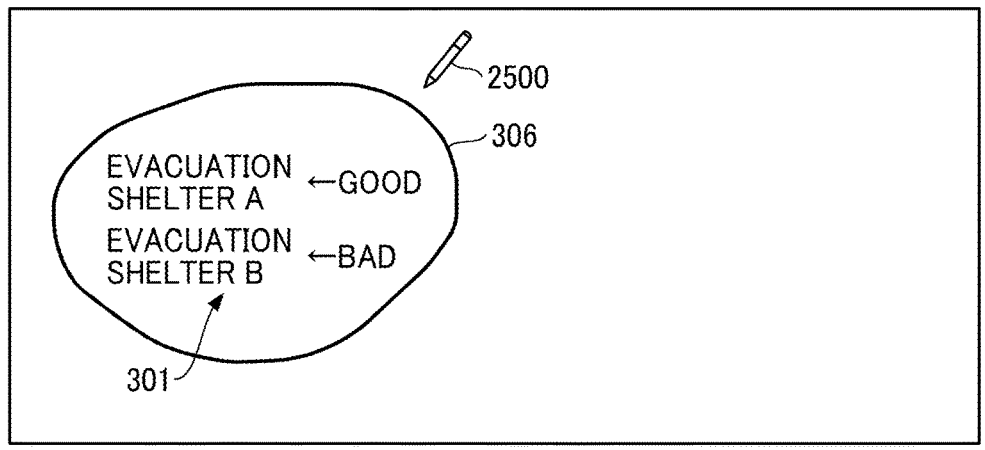
FIGS. 18A to 18E are diagrams for describing a process of capturing and pasting an object selected by an object selecting shape according to the exemplary embodiment of the disclosure.
Figure 18B:
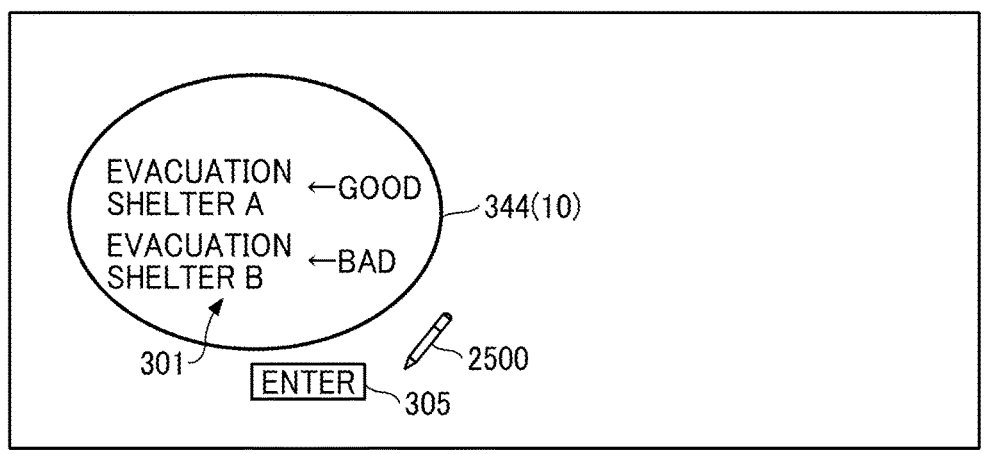

Referring to FIGS. 18A to 18E and 19, the capturing processing is described. FIGS. 18A to 18E are diagrams for describing a process of capturing and pasting an object selected by the object selecting shape 10. FIG. 18A is the same as FIG. 7. FIG. 18B illustrates the object 301 enclosed by (being in) the object selecting shape 10. The object 301 enclosed by (being in) the object selecting shape 10 is selected after entering a state of being selected in response to the enter button 305 being pressed, but not when being enclosed by the object selecting shape 10.

When the enter button 305 is pressed, the selection processing unit 31 selects the object 301 enclosed by (being in) the object selecting shape 10. The selection processing unit 31 sets the object 301 to the selected state and stores the selected object 301 in a storage location. The storage location is determined in advance, and may be a clipboard, and image data and object data can be read out. In the storage location, an area enclosed by, or defined by, the object selecting shape 10 may be stored as image data, or may be stored as object data (character code or coordinate point sequence).

Figure 18C:
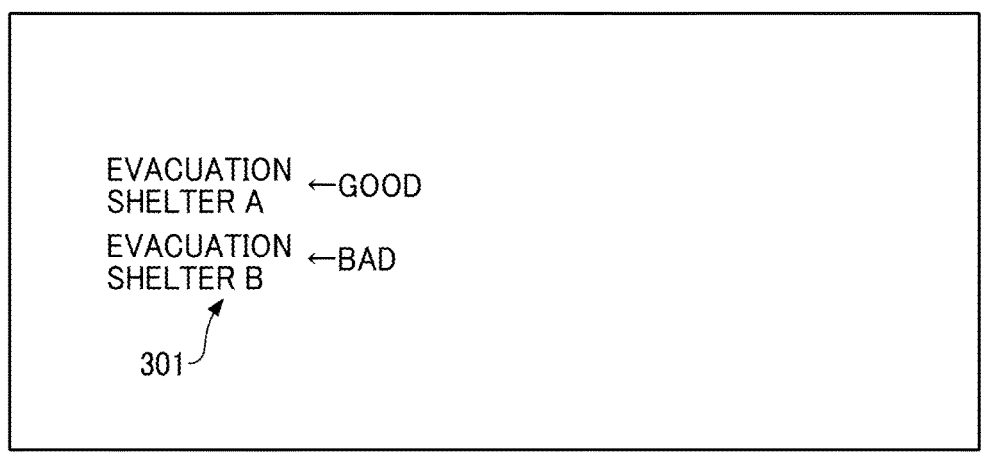

In addition, the display control unit 24 deletes the object selecting shape 10, since the object selecting shape is not to be used any more (see FIG. 18C).

Figure 18D:
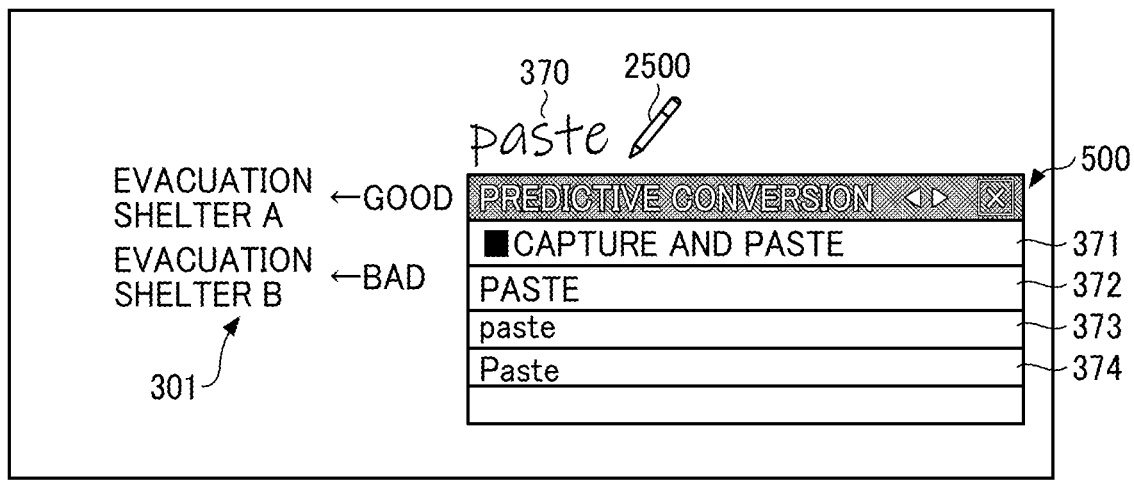

Next, when the user uses the image data or the object data, which is stored, the user input a preset command by hand drafted input. In FIG. 18D, the command includes "paste" and "PASTE." The conversion unit 23 performs character recognition on a stroke 370 of "paste," which is input by hand drafted input, or handwritten, and converts the stroke 370 into text, and the command processing unit 32 determines whether the text partially matches the command or not. When the text partially matches the command, a command 371 is displayed in the operation guide 500. In FIG. 18D, the command 371 of "CAPTURE AND PASTE" is displayed. "PASTE" 372, "paste" 373, and "Paste" 374 are character conversion candidates.

Figure 18E:
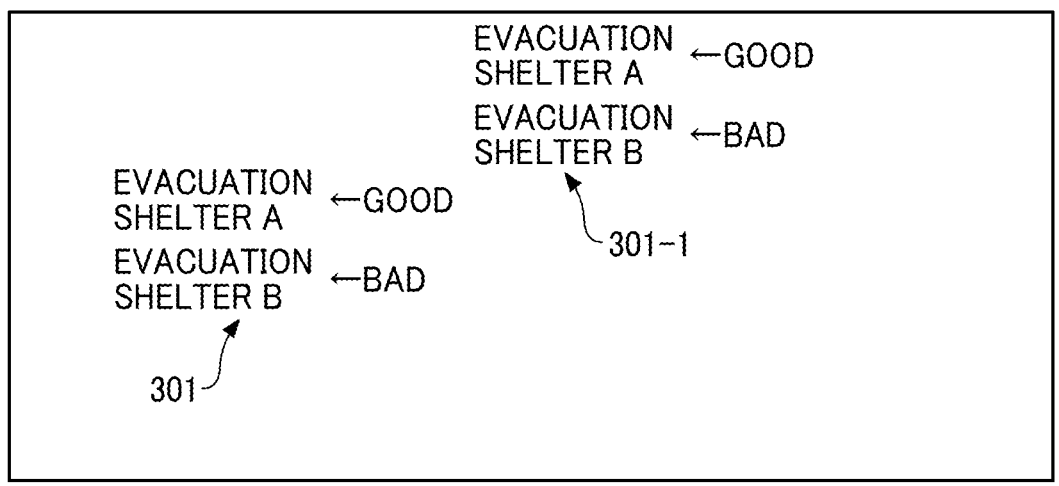

When the user selects the command 371 of "CAPTURE AND PASTE" with the pen 2500, the command processing unit 32 acquires stored object data 301-1 from the storage location, and the display control unit 24 displays the object data 301-1 at the location where the stroke 370 of "paste" is previously displayed (see FIG. 18E).

Figure 19:
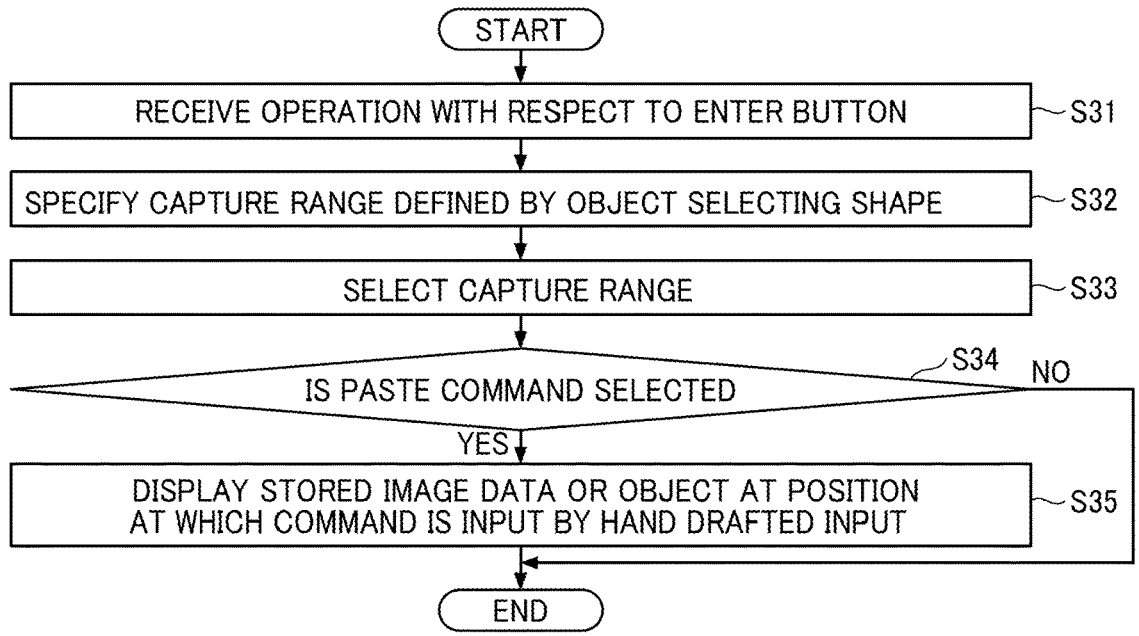
FIG. 19 is a flowchart illustrating a process performed by a selection processing unit when an enter button is pressed, according to the exemplary embodiment of the disclosure.

FIG. 19 is a flowchart illustrating a process performed by the selection processing unit 31 when the enter button 305 is pressed. The process illustrated in FIG. 19 starts when the enter button 305 is displayed.

First, the operation reception unit 27 receives a user operation of pressing the enter button 305 (S31). Since the position of the enter button 305 is known, whether the pen 2500 has touched the enter button 305 or not is determined.

When the enter button 305 is pressed, the selection processing unit 31 specifies a capture range that is enclosed by, or defined by, the object selecting shape 10 (S32). When the object selecting shape 10 is rectangular, the capture range is an area of quadrangle from the left end to the right end and from the upper end to the lower end of the object selecting shape 10. When the object selecting shape 10 is a circle, the capture range is an area of circle having a constant radius from the center of the circle of the object selecting shape 10.

The selection processing unit 31 selects the capture range as image data or as an object data (S33). The image data or the object in the capture range is a selected state. The selection processing unit 31 stores the selected capture range as the image data or as the object data. For example, the selection processing unit 31 may selectively switch storing operation. More specifically, when the object selecting shape 10 is a circle, the selection processing unit 31 may store the object data, and when the object selecting shape 10 is a rectangle, the selection processing unit 31 may store the image data. Whether the area to be stored is limited to the capture area or the area to be stored is expanded to an object that at least partially overlaps the capture area is set in advance in both cases of the rectangle and the circle. This can be selected by the user.

The image data or the object data, which is stored, can be reused by the user. When the user reuses the image data or object data, which is stored, a command is input by hand drafted input of the user, or handwritten by the user. For example, if text of "PASTE" is a command meaning reuse, the user writes "PASTE" by hand, namely inputs "PASTE" by handwriting.

The display control unit 24 displays the command 371 of "CAPTURE AND PASTE," and the command processing unit 32 determines whether the command 371 is selected or not (S34).

When the command 371 of "CAPTURE AND PASTE" is selected (Yes in S34), the command processing unit 32 acquires the stored image data or the stored object, and the display control unit 24 displays the image data or the object at the position where the command 371 is handwritten or input by hand drafted input (S35).

In the present embodiment, selection and saving (copying) of a capture range is described as an example. In addition, deleting, cutting, or moving a range selected by the object selecting shape 10 may be performed. In other words, the use of the object selecting shape 10 is not limited to capturing.

Start of Selection Mode in which Object Selecting Shape is not Displayed in Operation Guide In FIGS. 16 and 17, the object selecting shape 10 is displayed on the operation guide 500 and the user selects the object selecting shape 10. Accordingly, start of the selection mode and input of a shape are performed seamlessly. However, the control unit 30 may start the selection mode when an outline or a line shape of one or more strokes is determined to be similar to the object selecting shape 10 that is set to be special. The object selecting shape 10 that is set to be special is referred to as a special object selecting shape 10-1.

Figure 20A:
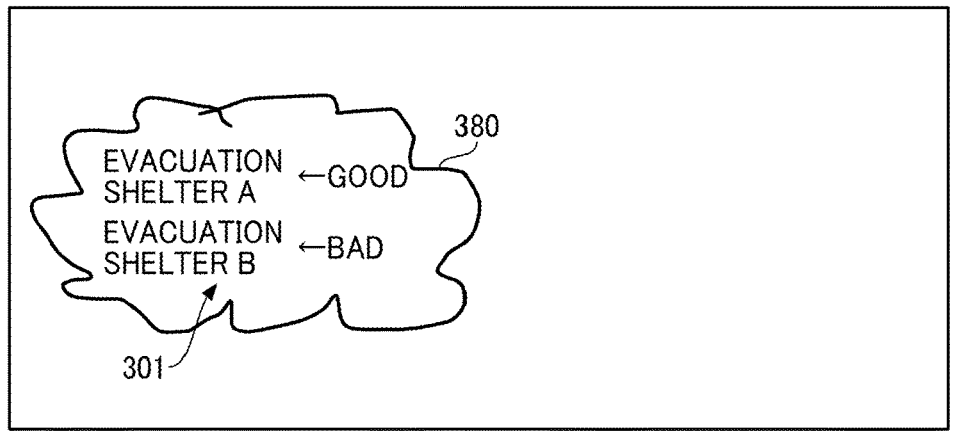
FIGS. 20A and 20B are diagrams illustrating an example of a special object selecting shape according to the exemplary embodiment of the disclosure.
Figure 20B:
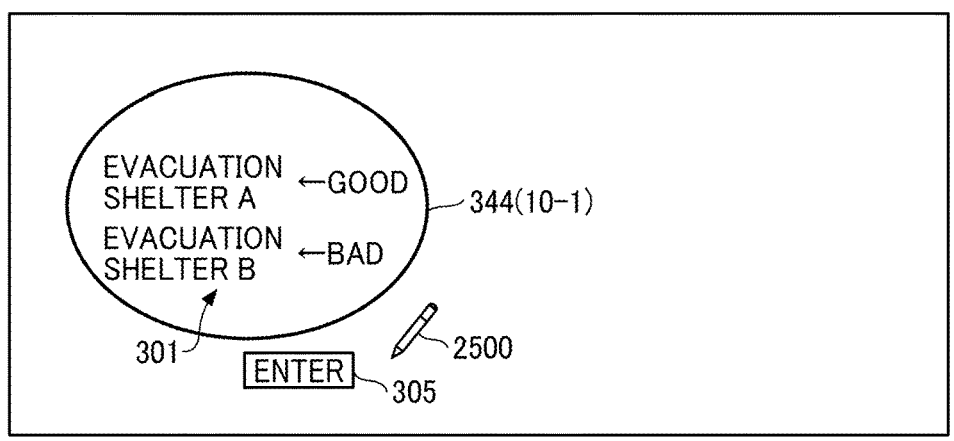

FIGS. 20A and 20B are diagrams illustrating an example of the special object selecting shape 10-1. It is assumed that a stroke 380 having a cloud shape, as illustrated in FIG. 20A, is set to the special object selecting shape 10-1. Since one or more strokes having a specific outline or a specific line shape, as described above, is preset not to be converted into a shape, the selection mode can be started without displaying the operation guide 500.

FIG. 20B illustrates a state in which the selection mode has started. The display control unit 24 displays, for example, the circle 344 that is preset to be displayed when the special object selecting shape 10-1 is recognized. In addition, the display control unit 24 displays the enter button 305 along with the circle 344. The circle 344 is the object selecting shape 10. As described above, the selection mode can be started without displaying the operation guide 500.

Figure 21:
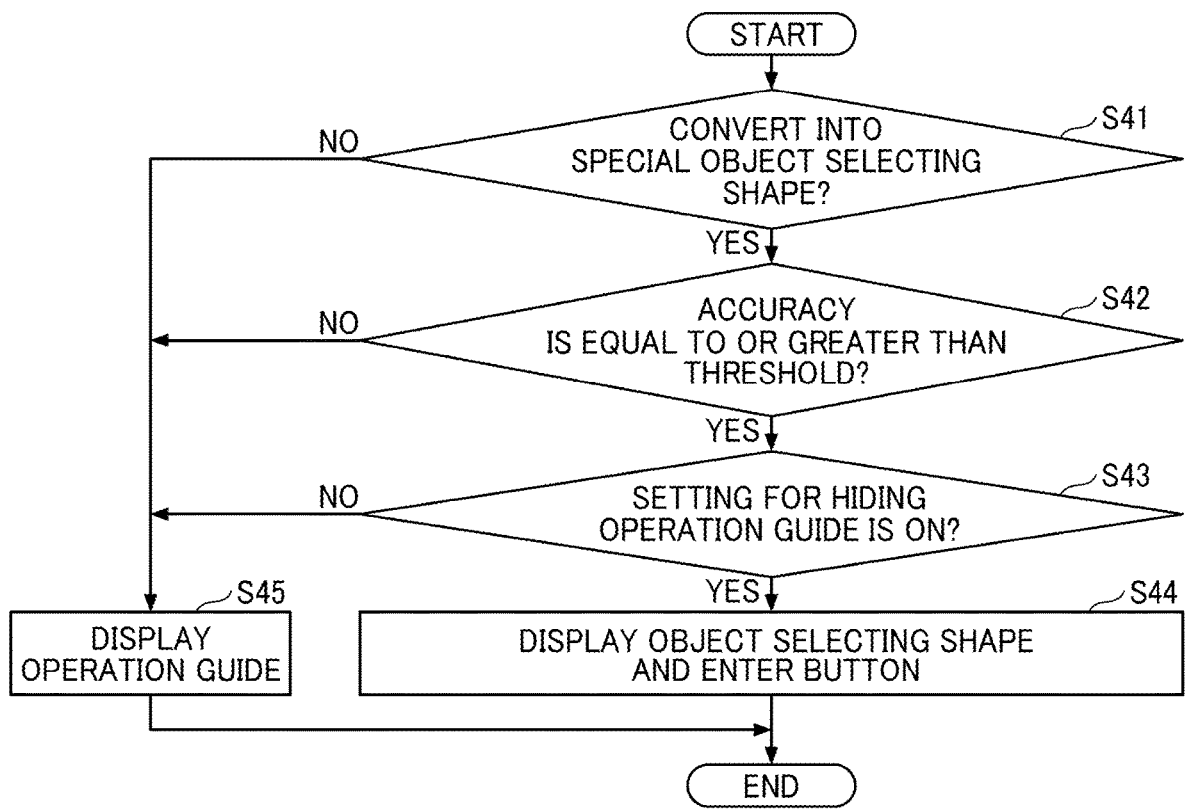
FIG. 21 is a flowchart illustrating an example of a process for starting a selection mode without displaying an operation guide, according to the exemplary embodiment of the disclosure.

FIG. 21 is a flowchart illustrating an example of a process for starting the selection mode without displaying the operation guide 500. The process of FIG. 21 is executed when one or more strokes of the same recognition group are input and compared to the special object selecting shape 10-1 (executed immediately before step S6 of FIG. 12).

The conversion unit 23 determines whether the one or more strokes of the same recognition group has been converted into the special object selecting shape 10-1 or not (S41).

When the one or more strokes are converted into the special object selecting shape 10-1 (Yes in S41), the conversion unit 23 determines whether conversion accuracy is equal to or greater than a threshold value (S42).

When the conversion accuracy is equal to or greater than the threshold value (Yes in S42), the display control unit 24 determines whether a setting for hiding the operation guide 500 is ON or not (S43). When the setting for hiding the operation guide 500 is ON, the operation guide 500 is displayed when the accuracy at the time of conversion is less than a certain value.

When the setting for hiding the operation guide 500 is ON (Yes in S43), the display control unit 24 displays the object selecting shape 10 and the enter button 305 (S44).

When any one of steps S41 to S43 is No, the operation guide 500 is to be displayed, and in such a case, the display control unit 24 displays the operation guide 500 (S45).

Application to Server Client System

Figure 22:
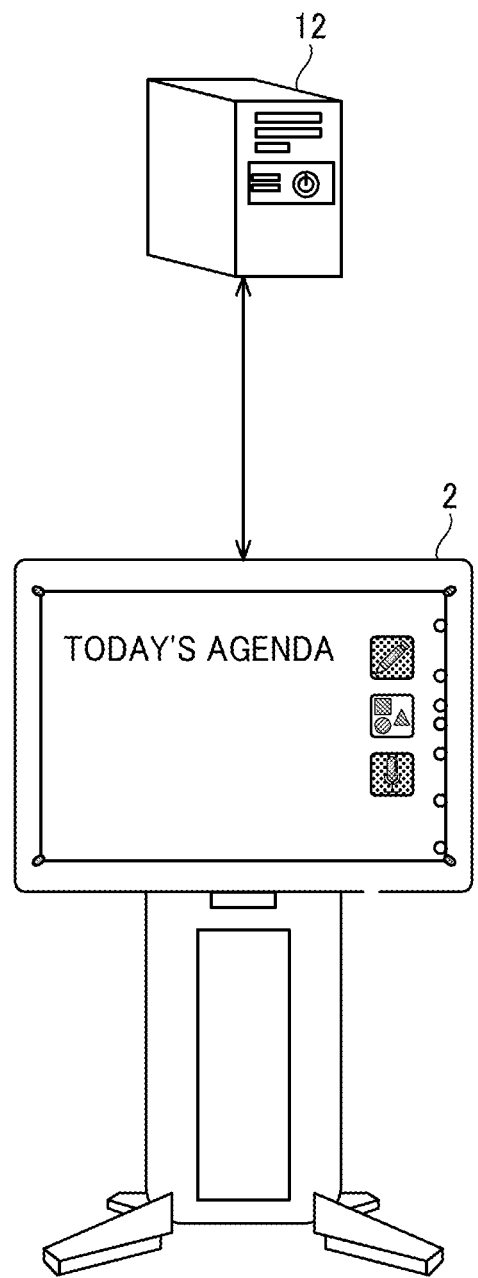
FIG. 22 is a diagram illustrating a configuration of a display system according to another embodiment of the disclosure.

FIG. 22 is a schematic diagram illustrating an example of a configuration of a display system 19. The function of the display apparatus 2 can also be implemented in a server client system as illustrated in FIG. 22. The display apparatus 2 and a server apparatus 12 are connected to each other through a network such as the Internet.

In the display system 19, the display apparatus 2 includes the input reception unit 21, the drawing data generation unit 22, the display control unit 24, the network communication unit 26, and the operation reception unit 27 illustrated in FIG. 4.

The server apparatus 12 includes the conversion unit 23, the data recording unit 25, the shape element determination unit 28, the recognition group determination unit 29, the control unit 30, the selection processing unit 31, the command processing unit 32, and the network communication unit 26.

The network communication unit 26 of the display apparatus 2 transmits stroke data to the server apparatus 12. The server apparatus 12 performs substantially the same processes as in the flowcharts of FIGS. 12 and 13 and transmits the recognition result to the display apparatus 2.

As described above, in the display system 19, the display apparatus 2 and the server apparatus 12 interactively process and display text data. In addition, since the object data is stored in the server apparatus 12, the display apparatus 2 or a PC provided in a remote site can connect to the server apparatus 12 and share the object data in real time.

As described above, in the display apparatus 2 according to the present embodiment, the input of the shape and the selection of the object are switched depending on whether the enter button 305 is pressed or not in inputting the shape. Accordingly, the user does not have to perform an operation of switching a mode of the display apparatus 2 to the selection mode (selection reception mode) for selecting the object. In addition, since whether one or more strokes are a shape or not is determined based on a height and a width of the one or more strokes, the user does not have to perform an operation of switching between a character recognition mode and a shape input mode.

Variation:

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

For example, in the present embodiment, an object is selected to be a selected state by pressing the enter button 305 and is stored. However, a copy button, a cut button, a move button, a delete button, or the like may be displayed in alternative to the enter button 305.

In addition, the display apparatus 2 may store an object enclosed by a stroke in response to selection of the object selecting shape 10 without a user operation of pressing the enter button 305. In this case, when the displayed object selecting shape is unnecessary, the user deletes the object selecting shape, by, for example, pressing and holding down the object selecting shape or by long-pressing or performing double click on the object selecting shape).

When the object selecting shape is displayed on the operation guide 500, shapes to be displayed in the operation guide 500 may be displayed in a manner that the user can see whether each shape is available for selection operation or used as a shape. When a shape to be used as a shape is selected, the shape is displayed, and when a shape available for selection operation is displayed, the shape is not displayed and an object is selected.

In the description of the above-described embodiments, the stroke data is mainly converted into Japanese, but the conversion destination language of the stroke data may be another language (English, Chinese, Hindi, Spanish, French, Arabic, Russian, etc.).

In the description of the above-described embodiments, the electronic whiteboard is used as an example to be described but is not limited thereto. The electronic whiteboard may be referred to as, for example, an electronic information board or an interactive board. The present disclosure is applicable to any information processing apparatus having a touch panel. Examples of the information processing apparatus with a touch panel include, but not limited to, a projector, a data output device such as a digital signage, a head up display (HUD), an industrial machine, an imaging device such as a digital camera, a sound collecting device, a medical device, a network home appliance, a notebook PC, a mobile phone, a smartphone, a tablet terminal, a game machine, a personal digital assistant (PDA), a wearable PC, and a desktop PC.

Further, in the embodiments described above, the display apparatus 2 detects the coordinates of the pen tip of the pen with the touch panel. However, the display apparatus 2 may detect the coordinates of the pen tip using ultrasonic waves. Further, the pen transmits an ultrasonic wave together with light emission, and the display apparatus 2 calculates a distance based on an arrival time of the ultrasonic wave. The display apparatus 2 determines the position of the pen based on the direction and the distance, and a projector draws (projects) the trajectory of the pen based on stroke data.

In the block diagram such as FIG. 4, functional units are divided into blocks in accordance with main functions of the display apparatus 2, in order to facilitate understanding of the operation by the display apparatus 2. No limitation to a scope of the present disclosure is intended by how the processes are divided or by the name of the processes. The processing implemented by the display apparatus 2 may be divided into a larger number of processing units depending on the content of the processing. Also, one processing unit can be divided so as to include more processing units.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Embodiments of the present disclosure can provide significant improvements in computer capability and functionality. These improvements allow users to take advantage of computers that provide more efficient and robust interaction with tables that is a way to store and present information on information processing apparatuses. In addition, embodiments of the present disclosure can provide a better user experience through the use of a more efficient, powerful, and robust user interface. Such a user interface provides a better interaction between humans and machines.

Aspect 1

According to Aspect 1, a display apparatus that displays hand drafted input as an object includes an input reception unit to receives the hand drafted input.

The display apparatus includes a conversion unit to convert the hand drafted input into a shape.

The display apparatus includes a determination unit to determine whether the converted shape is a preset object selecting shape or not.

The display apparatus includes a display control unit to display a display component for receiving selection of a displayed object displayed in the preset object selecting shape, in a case that the determination unit determines that the converted shape is the preset object selecting shape.

The display apparatus includes a selection processing unit to cause the displayed object to be a selected state when the selection of the display component is received.

Aspect 2

According to Aspect 2, in the display apparatus according to Aspect 1, the conversion unit can convert the hand drafted input into tex.

The conversion unit converts the hand drafted input that has a shape element into the shape, based on a height and a width of the hand drafted input.

The conversion unit converts the hand drafted input that does not have the shape element into the text.

Aspect 3

According to Aspect 3, in the display apparatus according to any one of Aspect 1 and Aspect 2, the display control unit displays one or more shape conversion candidates that are converted from the hand drafted input by the conversion unit.

When one of the one or more shape conversion candidates is the preset object selecting shape, and when selection of the one of the one or more shape conversion candidates is received, the shape is displayed and a selection mode for selecting the object by using the shape is started.

When one of the one or more shape conversion candidates is not the object selecting shape, and when selection of the one of the one or more shape conversion candidates is received, the shape is displayed.

Aspect 4

According to Aspect 4, in the display apparatus according to Aspect 3, when the one of one or more shape conversion candidates of which selection is received is the object selecting shape, the display control unit displays the selected object selecting shape based on a size and a position of the hand drafted input, and further displays a display component for receiving selection of the object.

the display control unit deletes, or hides, the display component after a predetermined period of time has elapsed.

Aspect 5

According to Aspect 5, in the display apparatus according to Aspect 4, when the display control unit deletes, or hides, the display component after the predetermined period of time has elapsed, the display control unit keeps displaying the shape converted by the conversion unit, and the determination unit ends the selection mode.

Aspect 6

According to Aspect 6, in the display apparatus according to Aspect 4, the object selecting shape is a circle or a rectangle.

The conversion unit converts the hand drafted input into the circle or the rectangle.

When the display component is pressed, the selection processing unit sets image data of an area enclosed by the circle or the rectangle or object data representing the object enclosed by the circle or the rectangle to a selected state.

Aspect 7

According to Aspect 7, the display apparatus according to any one of Aspect 4 to Aspect 6, further includes an operation reception unit to receive an operation for changing a size and a position of the object selecting shape.

The display control unit does not delete, or hide, the display component even after the predetermined period of time has elapsed while the operation reception unit receives the operation for changing the size and the position of the object selecting shape.

Aspect 8

According to Aspect 8, in the display apparatus according to Aspect 6, when text converted by the conversion unit partially matches a preset command, the display control unit displays the command.

The display apparatus further includes a command processing unit to execute processing with the stored image data or the stored object data when selection of the command to use the image data or the object data is received.

Aspect 9

According to Aspect 9, in the display apparatus according to Aspect 8, the command is a command for executing pasting.

When the command processing unit executes pasting, the display control unit displays the stored image data or the stored object data.

Aspect 10

According to Aspect 10, in the display apparatus according to Aspect 3, the display control unit does not display a shape conversion candidate when the accuracy of the shape conversion candidate converted from the hand drafted input by the conversion unit is equal to or greater than a threshold value.

When the conversion unit converts the hand drafted input into a preset special object selecting shape, the display control unit displays the shape.

The determination unit starts a selection mode for selecting the object by using the shape.

Aspect 11

According to Aspect 11, the display apparatus according to Aspect 2 further includes a shape element determination unit to determine the hand drafted input as the shape element, when the height of the hand drafted input is greater than a threshold a, or when the height of the hand drafted input is equal to or less than a threshold c and a width of the hand drafted input is greater than a threshold b.

Aspect 12

According to Aspect 12, the display apparatus according to Aspect 11 further includes a recognition group determination unit to set a neighborhood rectangle for the hand drafted input and determine another hand drafted input intersecting the neighborhood rectangle as one that belongs to the same recognition group as the hand drafted input.

The conversion unit collectively converts the hand drafted inputs of the same recognition group into the shape.

In a related art, no consideration has been given to convenience in selectively using between drawing a shape by a hand drafted input operation and selecting an object by a hand drafted input operation.

According to an embodiment of the present disclosure, convenience in selectively using between drawing a shape by a hand drafted input operation and selecting an object by a hand drafted input operation is improved.

The invention claimed is:

1. A display apparatus, comprising circuitry configured to:
receive input of a hand drafted input;
convert the hand drafted input into a shape, wherein the shape converted from the hand drafted input includes one or more shape conversion candidates;
display, on a display, the one or more shape conversion candidates; and
determine whether the shape is an object selecting shape that is preset to be available for selecting an object displayed in the object selecting shape on the display,
wherein, in a case that the shape is determined to be the object selecting shape, the circuitry displays, on the display, a display component to be operated for receiving selection of the object,
wherein, in a case that the display component is operated, the circuitry causes the object to be a selected state,
wherein, in a case that one of the one or more conversion candidates is selected, the circuitry displays, on the display, the shape, and
wherein, in a case that the one of the one or more conversion candidates is the object selecting shape, the circuitry is configured to
start a selection mode for selecting the object with the object selecting shape,
display, on the display, the shape as the object selecting shape along with the display component, based on a size and a position of the hand drafted input, and
delete the display component after a predetermined period of time has elapsed.

2. The display apparatus of claim 1, wherein
the hand drafted input is determined to be a shape element, and
the circuitry is further configured to convert the hand drafted input into the shape based on a height and a width of the hand drafted input.

3. The display apparatus of claim 2, wherein the circuitry is further configured to:
receive input of a different hand drafted input that is a different element other than the shape element; and
convert the different hand drafted input into a text.

4. The display apparatus of claim 1, wherein
in response to deleting the display component after the predetermined period of time, the circuitry
ends the selection mode with the object selecting shape, and
causes the shape being currently displayed as the object selecting shape to turn to the shape converted from the hand drafted input.

5. The display apparatus of claim 1, wherein
the object selecting shape is one of a circle and a rectangle,
wherein the circuitry
converts the hand drafted input into the shape being the one of the circle and the rectangle, and
causes one of image data and object data to be the selected state in response to the display component being operated, the image data representing an image of a range enclosed by the one of the circle and the rectangle, the object data representing the object being in the range enclosed by the one of the circle and the rectangle.

6. The display apparatus of claim 1, wherein
the circuitry is further configured to:
receive an operation for changing a size and a position of the object selecting shape, and
keep displaying, on the display, the display component when the predetermined time has elapsed, while receiving the operation for changing the size and the position of the object selecting shape.

7. The display apparatus of claim 5, wherein
the circuitry is further configured to
receive additional input of a different hand drafted input;
convert the different hand drafted input into a text;

display, on the display, a command in response to determining that the text partially matches the command that is preset for executing processing with the one of the image data and the object data; and execute the processing in response to receiving selection of the command.

8. The display apparatus of claim 7, wherein
the processing is pasting, and
the circuitry further displays, on the display, the one of the image data and the object data in response to executing pasting.

9. The display apparatus of claim 1, wherein
in one of a first case that accuracy of conversion into the shape from the hand drafted input is equal to or greater than a threshold, the circuitry
hides the one or more shape conversion candidates,
displays, on the display, the shape in response to the shape being a special object selecting shape that is preset to be available for selecting the object, and
starts a selection mode for selecting the object with the shape.

10. The display apparatus of claim 2, wherein
in one of a first case that the height of the hand drafted input is greater than a first height threshold, and a second case that the height of the hand drafted input is greater than a first height threshold, and that the width of the hand drafted input is greater than a width threshold, the circuitry is further configured to determine that the hand drafted input is the shape element.

11. The display apparatus of claim 9, wherein
the circuitry is further configured to:
set a neighborhood rectangle for the hand drafted input,
determine another hand drafted input intersecting the neighborhood rectangle as one that belongs to a same recognition group as the hand drafted input; and
collectively convert the hand drafted input and the another hand drafted input that belong to the same recognition group into the shape.

12. A display method, comprising:
receiving input of a hand drafted input;
converting the hand drafted input into a shape, wherein the shape converted from the hand drafted input includes one or more shape conversion candidates;
displaying, on a display, the one or more shape conversion candidates;
determining whether the shape is an object selecting shape that is preset to be available for selecting an object displayed in the object selecting shape on the display;
displaying, on the display, a display component to be operated for receiving selection of the object in response to determining that the shape is the object selecting shape;
causing the object to be a selected state in response to the display component being operated;
in a case that one of the one or more conversion candidates is selected, displaying the shape;
in a case that the selected one of the one or more conversion candidates is the object selecting shape,
starting a selection mode for selecting the object with the object selecting shape,
displaying, on the display, the shape as the object selecting shape along with the display component, based on a size and a position of the hand drafted input, and
deleting the display component after a predetermined period of time has elapsed.

13. A non-transitory recording medium storing a plurality of instructions which, when executed by one or more processors, causes the processors to perform a method, the method comprising:
receiving input of a hand drafted input;
converting the hand drafted input into a shape, wherein the shape converted from the hand drafted input includes one or more shape conversion candidates;
displaying, on the display, the one or more shape conversion candidates;
determining whether the shape is an object selecting shape that is preset to be available for selecting an object displayed in the object selecting shape on the display;
displaying, on the display, a display component to be operated for receiving selection of the object in response to determining that the shape is the object selecting shape;
causing the object to be a selected state in response to the display component being operated;
in a case that one of the one or more conversion candidates is selected, displaying the shape;
in a case that the selected one of the one or more conversion candidates is the object selecting shape,
starting a selection mode for selecting the object with the object selecting shape,
displaying, on the display, the shape as the object selecting shape along with the display component, based on a size and a position of the hand drafted input, and
deleting the display component after a predetermined period of time has elapsed.

* * * * *